(12) United States Patent
Jensen

(10) Patent No.: US 9,807,829 B2
(45) Date of Patent: Oct. 31, 2017

(54) VOLTAGE ISOLATING CURRENT CONTROL CIRCUITS

(71) Applicant: Jonathan Jensen, Pocatello, ID (US)

(72) Inventor: Jonathan Jensen, Pocatello, ID (US)

(73) Assignee: SnapRays LLC, Vineyard, UT (US)

( * ) Notice: Subject to any disclaimer, the term of this patent is extended or adjusted under 35 U.S.C. 154(b) by 0 days.

(21) Appl. No.: 15/409,508

(22) Filed: Jan. 18, 2017

(65) Prior Publication Data

US 2017/0208657 A1    Jul. 20, 2017

Related U.S. Application Data

(60) Provisional application No. 62/279,831, filed on Jan. 18, 2016.

(51) Int. Cl.
*H05B 37/02* (2006.01)
*H05B 33/08* (2006.01)
*H01H 47/00* (2006.01)

(52) U.S. Cl.
CPC ......... *H05B 33/0812* (2013.01); *H01H 47/00* (2013.01); *H05B 33/0854* (2013.01)

(58) Field of Classification Search
None
See application file for complete search history.

(56) References Cited

U.S. PATENT DOCUMENTS

| 4,760,284 | A | 7/1988 | Taylor |
| 5,914,619 | A | 6/1999 | Tihanyi |
| 6,005,375 | A | 12/1999 | van Saders et al. |
| 6,423,900 | B1 * | 7/2002 | Soules .................. H01H 9/185 174/66 |
| 7,038,295 | B2 | 5/2006 | Hadizad |
| 7,728,529 | B2 | 6/2010 | Liu et al. |
| 7,872,377 | B2 * | 1/2011 | Wilson ............... H05B 37/0263 307/114 |
| 8,138,836 | B2 | 3/2012 | Matsuzuka et al. |
| 8,569,811 | B1 | 10/2013 | Vorhaus et al. |
| 8,637,909 | B1 | 1/2014 | Vorhaus |
| 2001/0046130 | A1 * | 11/2001 | Cunningham ........... A47L 5/38 362/95 |
| 2009/0180274 | A1 * | 7/2009 | Glazner ............. H05B 33/0803 362/95 |
| 2011/0266967 | A1 * | 11/2011 | Bordin ............... H05B 33/0815 315/287 |
| 2012/0049742 | A1 * | 3/2012 | Lee ..................... H05B 33/0809 315/122 |
| 2012/0068612 | A1 * | 3/2012 | Ebeling ............. H01R 13/5213 315/159 |
| 2012/0253535 | A1 | 10/2012 | Newman, Jr. et al. |
| 2012/0286940 | A1 * | 11/2012 | Carmen, Jr. ........ F21V 33/0052 340/12.5 |
| 2014/0054060 | A1 | 2/2014 | Smith et al. |

(Continued)

*Primary Examiner* — Tung X Le
*Assistant Examiner* — Raymond R Chai

(57) ABSTRACT

In one example, an electrical circuit includes a first functional block with an electrical load to produce an external result, a second functional block with a voltage isolator; a third functional block with a current controller. The first, second, and third functional blocks are connected such that the external result of the electrical load is determined by the current controller acting through the voltage isolator. The voltage isolator may be configured to limit a maximum voltage across the current controller.

20 Claims, 19 Drawing Sheets

(56) References Cited

U.S. PATENT DOCUMENTS

| | | | |
|---|---|---|---|
| 2014/0084801 A1* | 3/2014 | Lys | H05B 33/0812 |
| | | | 315/201 |
| 2015/0257218 A1 | 9/2015 | Mentze et al. | |
| 2016/0013789 A1 | 1/2016 | Montrose et al. | |
| 2016/0021719 A1* | 1/2016 | Civiello | H05B 37/02 |
| | | | 315/293 |
| 2016/0113077 A1* | 4/2016 | Akiyama | H05B 33/0815 |
| | | | 315/201 |

* cited by examiner

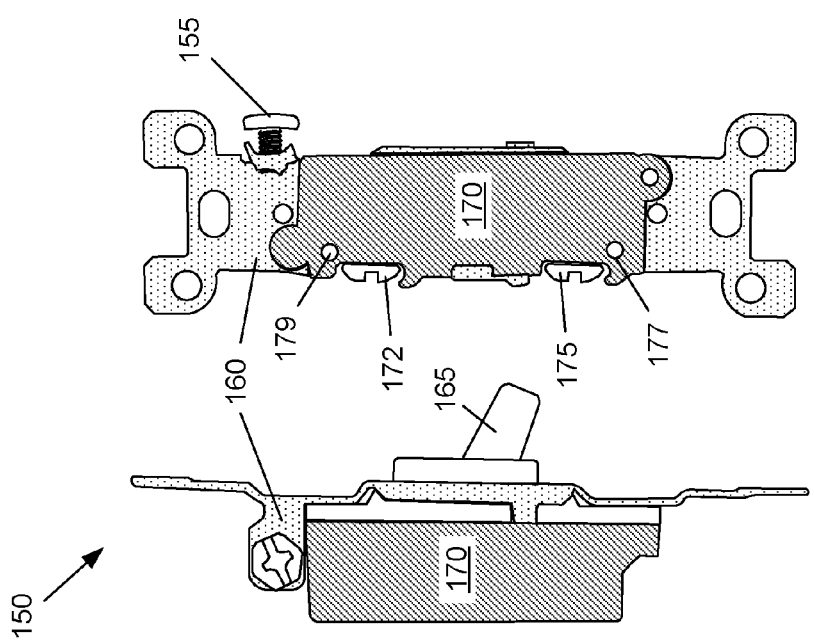
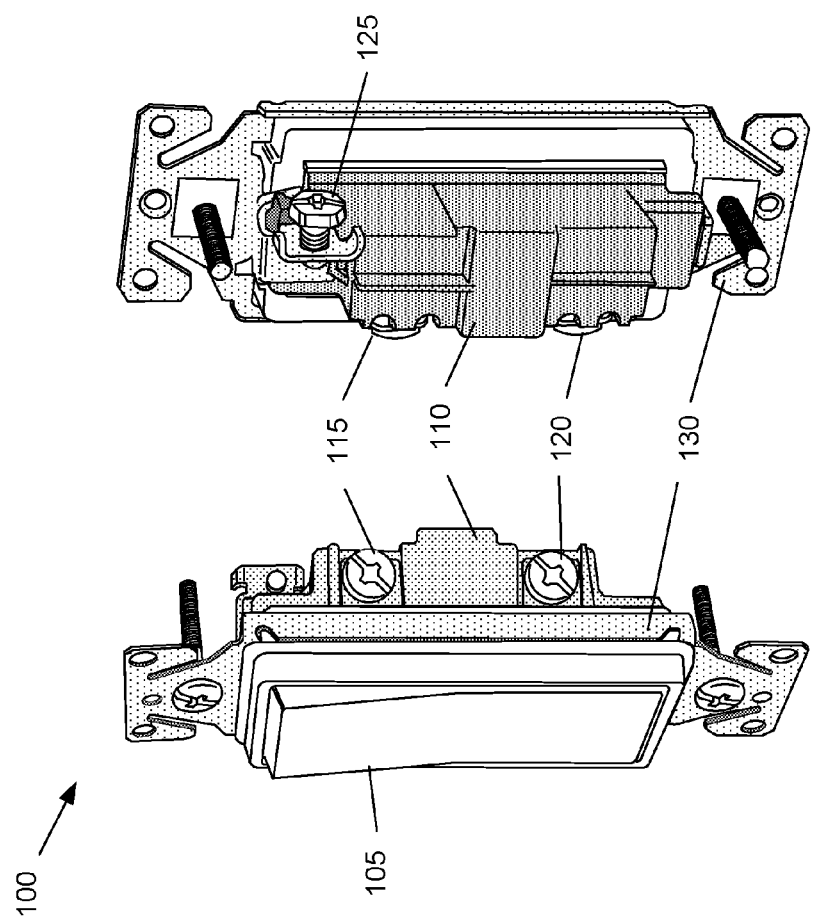
Fig. 1D
Fig. 1C
Fig. 1B
Fig. 1A

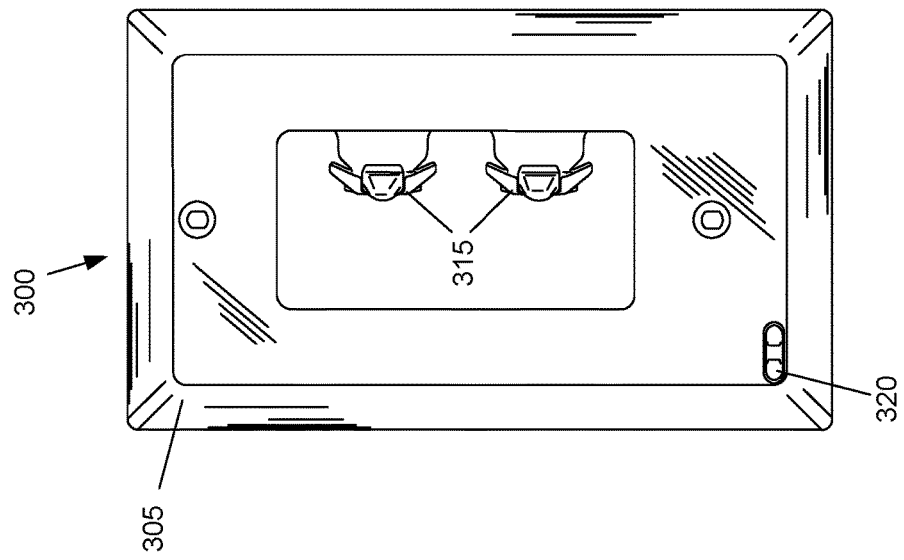
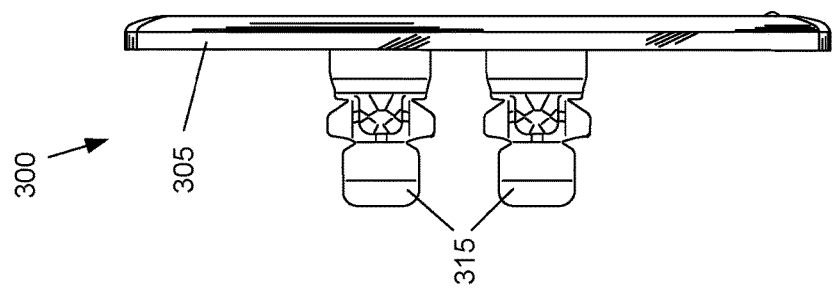
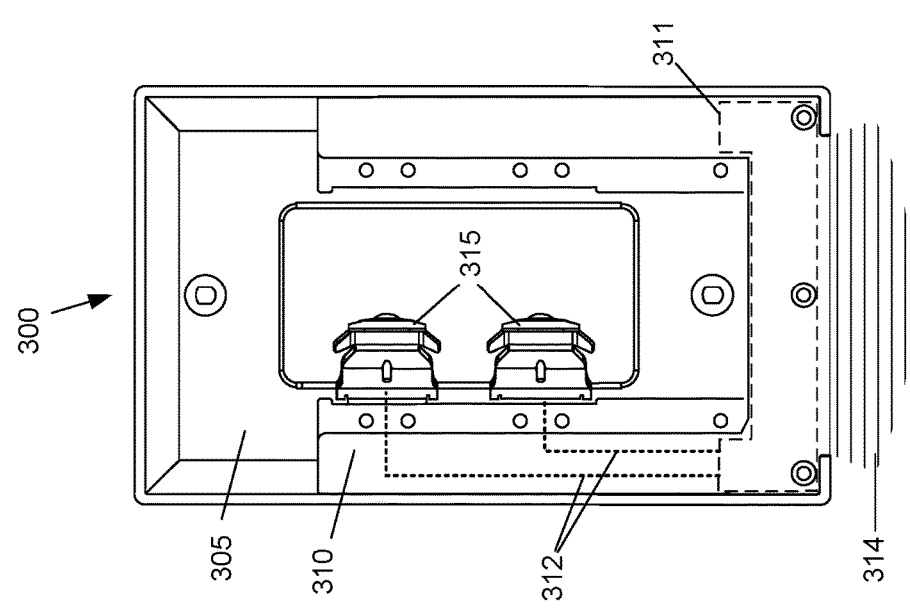

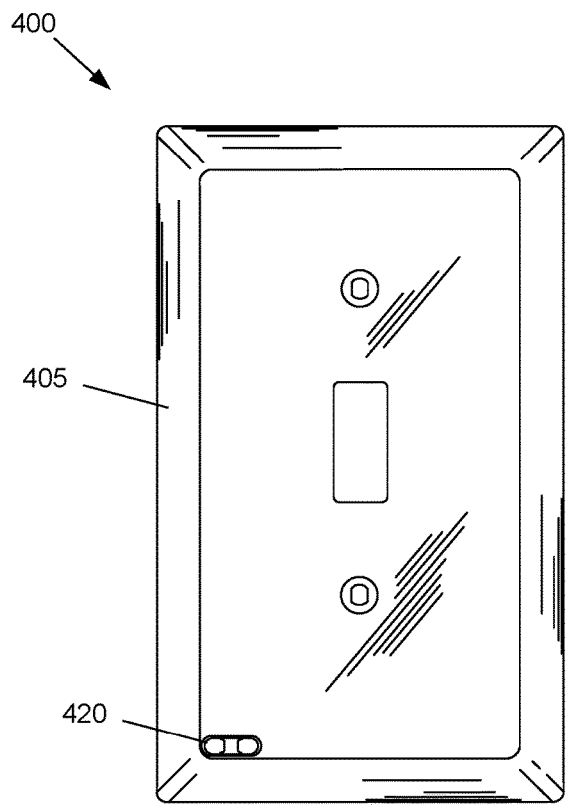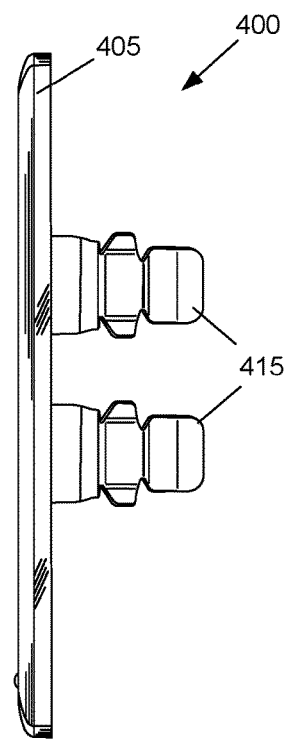
Fig. 4A    Fig. 4B
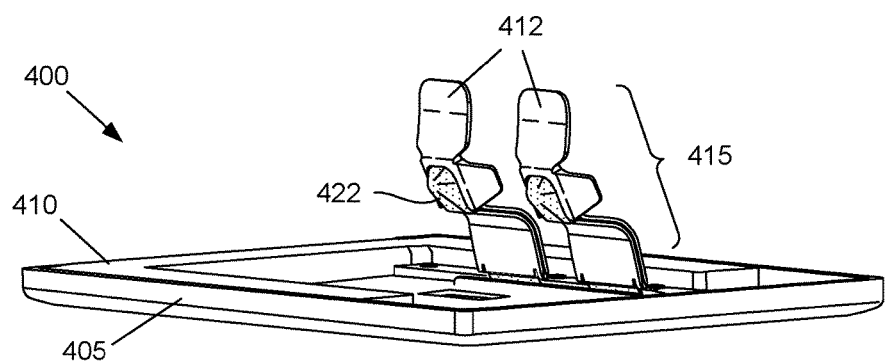
Fig. 4C

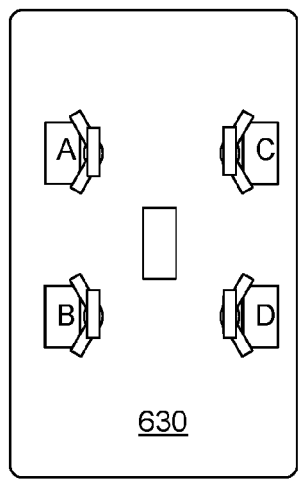
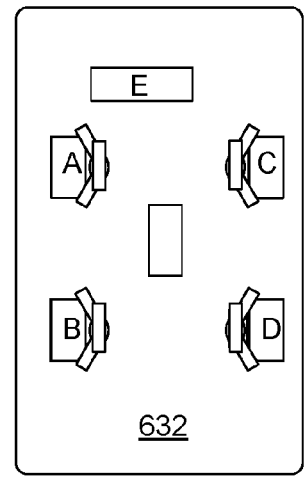
*Fig. 6C*       *Fig. 6D*
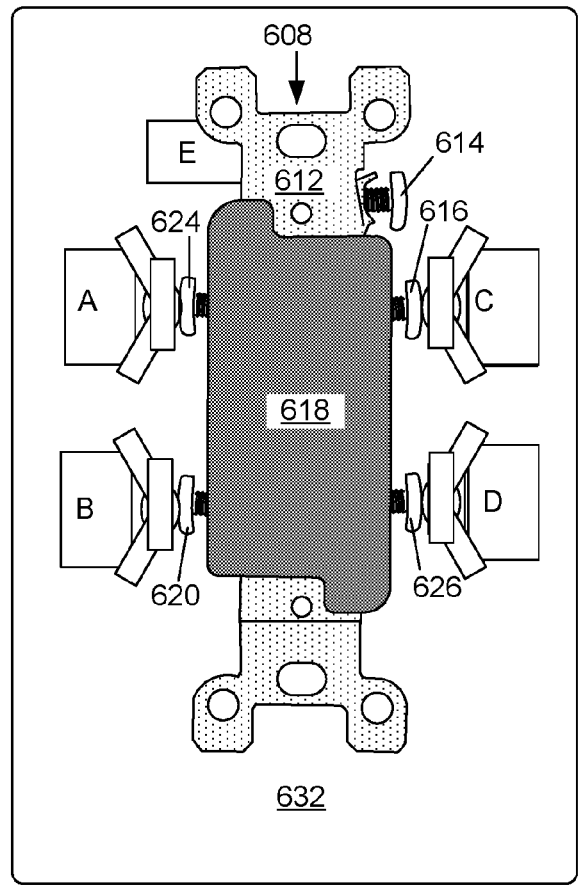
*Fig. 6E*

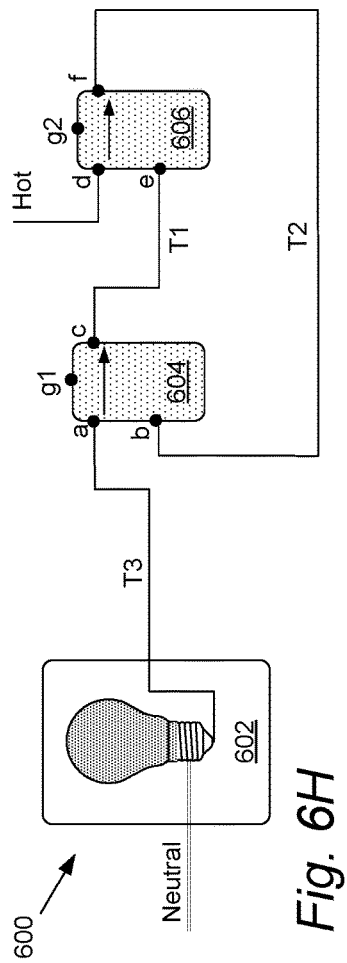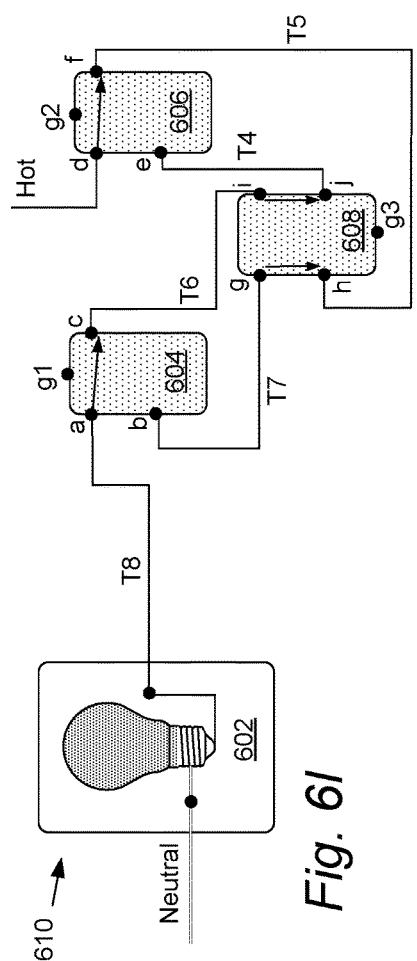

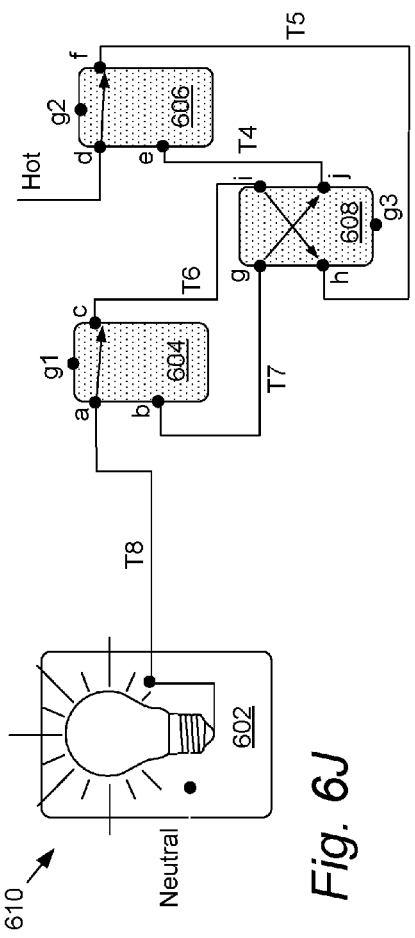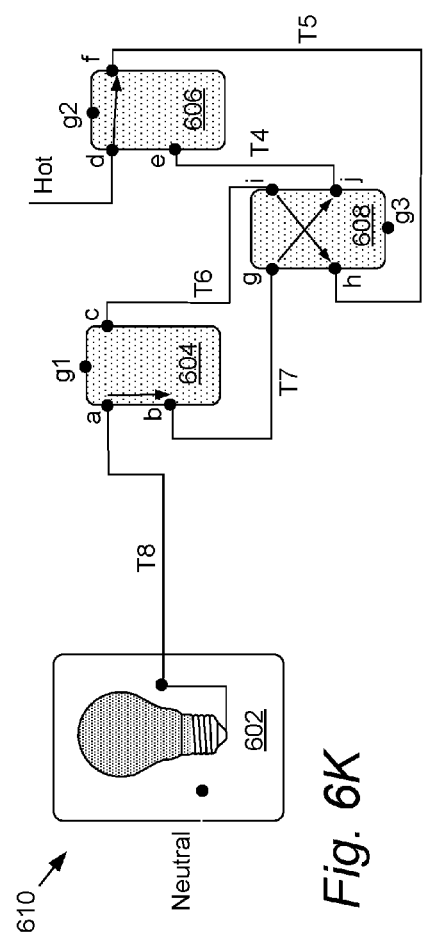
Fig. 6J
Fig. 6K

VOLTAGE ISOLATING CURRENT CONTROL CIRCUITS

RELATED APPLICATIONS

The present application claims priority under 35 U.S.C. §119(e) to U.S. Provisional Application No. 62/279,831, titled "Functional wall plates," filed Jan. 18, 2016 which application is incorporated by reference in its entirety.

BACKGROUND

Modern buildings include wiring to deliver electrical power to lights, outlets, and other devices. The electrical wiring terminates in an electrical box in a wall, ceiling, floor or connected to another structural element. Connections are made to the wiring in the electrical box. For example, electrical wiring may be connected to switches by stab-in connectors or with screw terminals on the sides of the switch body. After installation, a wall plate is placed over the switch body to cover the opening to the box while allowing access to manually manipulate the switches.

BRIEF DESCRIPTION OF THE DRAWINGS

The accompanying drawings illustrate various examples of the principles described herein and are a part of the specification. The illustrated examples are merely examples and do not limit the scope of the claims.

FIGS. 1A-1D are views of two different switches, according to one example of principles described herein.

FIGS. 3A-3C show an illustrative functional wall plate for a décor light switch, according to one example of principles described herein.

FIGS. 4A-4C show an illustrative functional wall plate for a toggle light switch, according to one example of principles described herein.

FIGS. 6C and 6D are diagrams of illustrative functional wall plates for multi-pole switches, according to one example of principles described herein.

FIG. 6E shows a functional wall plate mounted over a multi-pole light switch, according to one example of principles described herein.

FIGS. 6F-6K are diagrams of electrical systems using multi-pole switches, according to one example of principles described herein.

Throughout the drawings, identical reference numbers designate similar, but not necessarily identical, elements.

DETAILED DESCRIPTION

Figure 2A:
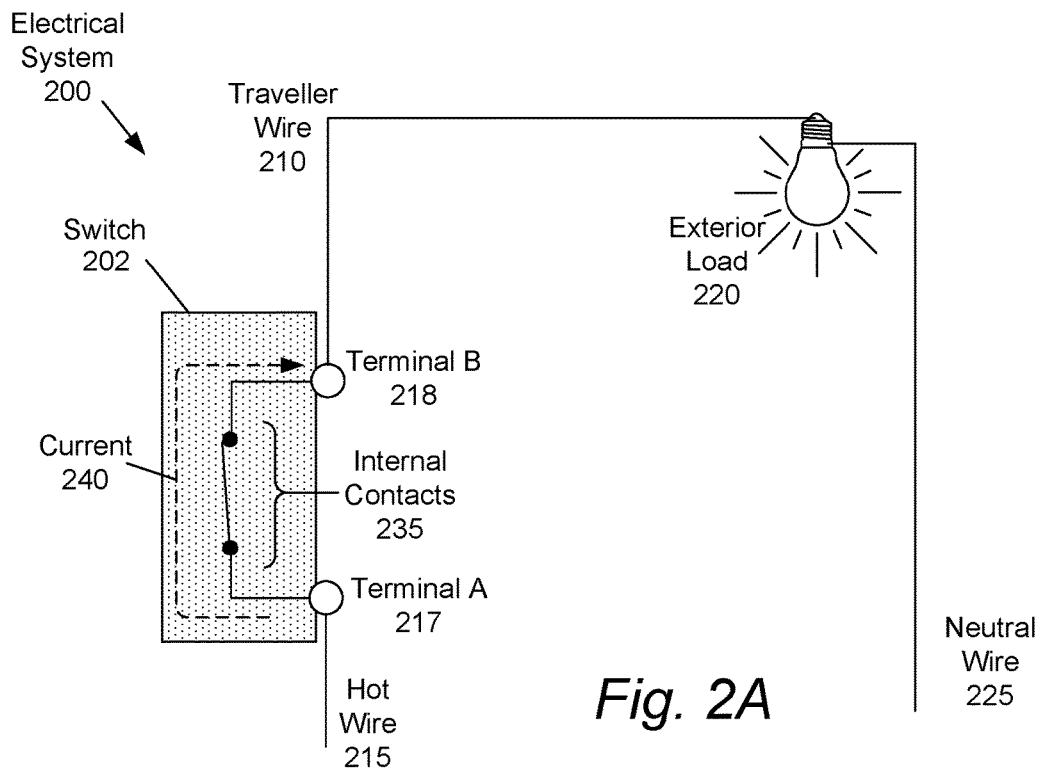
FIGS. 2A and 2B are diagrams of electrical systems that include a switch and a load controlled by the switch, according to one example of principles described herein.

Reference will now be made to the figures wherein like structures will be provided with like reference designations. In the following description, for purposes of explanation, numerous specific details are set forth in order to provide a thorough understanding of the present systems and methods. It will be apparent, however, that systems and methods may be practiced without these specific details. It is understood that the figures are diagrammatic and schematic representations of some embodiments of the invention, and are not limiting of the present invention, nor are they necessarily drawn to scale. Reference in the specification to "an example" or similar language means that a particular feature, structure, or characteristic described in connection with the example is included in at least that one example, but not necessarily in other examples. Additionally, features shown and/or described in connection with one figure may be combined with features shown and/or described in connection with other figures.

Switches are a standard fixture in modern homes. Switches are typically placed near entryways or doors so that a person entering or leaving an area can easily turn on or off the lights or appliances. The position of the switch installations makes them ideal for incorporating nightlights, guidelights, or illuminated images. For example, if a switch installation incorporated a nightlight, the nightlight would illuminate the entry way, the floor around the entryway and the light switch itself. The nightlight would provide a valuable reference point to allow a home owner to orient themselves and properly navigate the area.

While the attractiveness of nightlights incorporated into switch installations is clear, there are a number of significant challenges in designing a nightlight that is easy to install and provides the desired level of illumination without adverse effects.

Standard switches in North America (Canada, United States, Mexico, etc.) have two standard styles: toggle and décor. FIGS. 1A and 1B show a décor switch (100), also called a rocker switch. The switch (100) includes a rocker paddle (105) and a body (110). To change the state of the switch and its controlled load, the user depresses either the top or bottom of the paddle (105). This changes the internal state of contacts within the switch (105) to either connect or disconnect the electrical load from a power source. The body (110) of the switch includes two screw terminals (115, 120) and a yoke (130). The screw terminals (115, 120) serve as attachment points for electrical wiring. For example, a "hot" wire may be attached to one of the terminals and a traveler wire may be attached to the other terminal. The hot wire supplies electrical power to the switch and the traveler wire connects the switch to the electrical load. When the switch (100) is in the ON position, internal contacts connect the first screw terminal (115) to the second screw terminal (120) and electrical energy is available to the load. When the switch is in the OFF position, the internal contacts do not make a connection between the screw terminals and there is no electrical power available to the load.

The yoke (130) provides a structure to connect the switch (100) to a housing such as an electrical box. In some switches, the yoke or bracket (130) is metal and may be connected to a ground screw terminal (125). A ground wire may be connected to the ground screw terminal (125) to ensure that if there is a fault in the electrical system and electricity is applied to the yoke (130), this electricity will be dissipated through the ground wire.

FIGS. 1C and 1D show an illustrative example of a toggle switch (150). The switch (150) includes a toggle (165), a yoke (160), two screw terminals (172, 175) and a ground terminal (155). To operate the toggle switch (150) a user moves the toggle (165) either up or down to change the state of the internal contacts in the toggle switch (150). As discussed above, this either connects or disconnects the internal electrical path between the two screw terminals. The yoke (160) in this example is metal and can be electrically connected to a ground wire using the ground screw terminal (155).

One method of connecting the wires to the screw terminals (172, 175) includes loosening the screws and wrapping the electrical wire around the shaft of the screw, then tightening the screw to sandwich the wire between the head of the screw and the switch body (170). FIG. 1D also shows an alternative mechanism for connecting wires to the screw terminals. This alternative connection uses stab-in connectors (177, 179). The end of the electrical wire is stripped and forced into the stab-in connectors (177, 179) to make an electrical connection with the internal contacts without utilizing screw terminals. Even when stab in connectors are used the screw terminals (172, 175) remain part of the electrical circuit.

FIG. 2A is a block diagram showing an illustrative electrical system (200) for controlling a load. In this example, the system (200) includes a switch (202), wiring (215, 210, 225) and an exterior load (220). In this case the exterior load (220) is illustrated as an overhead light, but the load could be any electrical load that can be controlled by a switch, including lamps, motors, fans, air conditioners, etc. Terminal A (217) of the switch (202) is connected to a hot wire (215). The hot wire (215) is part of the power distribution in the house or building and delivers electricity to the system. The switch (202) includes internal contacts (235) which control the flow of electrical current through the switch. In this case the internal contacts (235) are closed. This allows a current flow (240) through the switch to terminal B (218) which is connected to a traveler wire (210) that is connected to the load (220). The current passes through the load (220) and into the neutral wire (225). The neutral wire (225) acts as a sink for the electrical current.

Figure 2B:
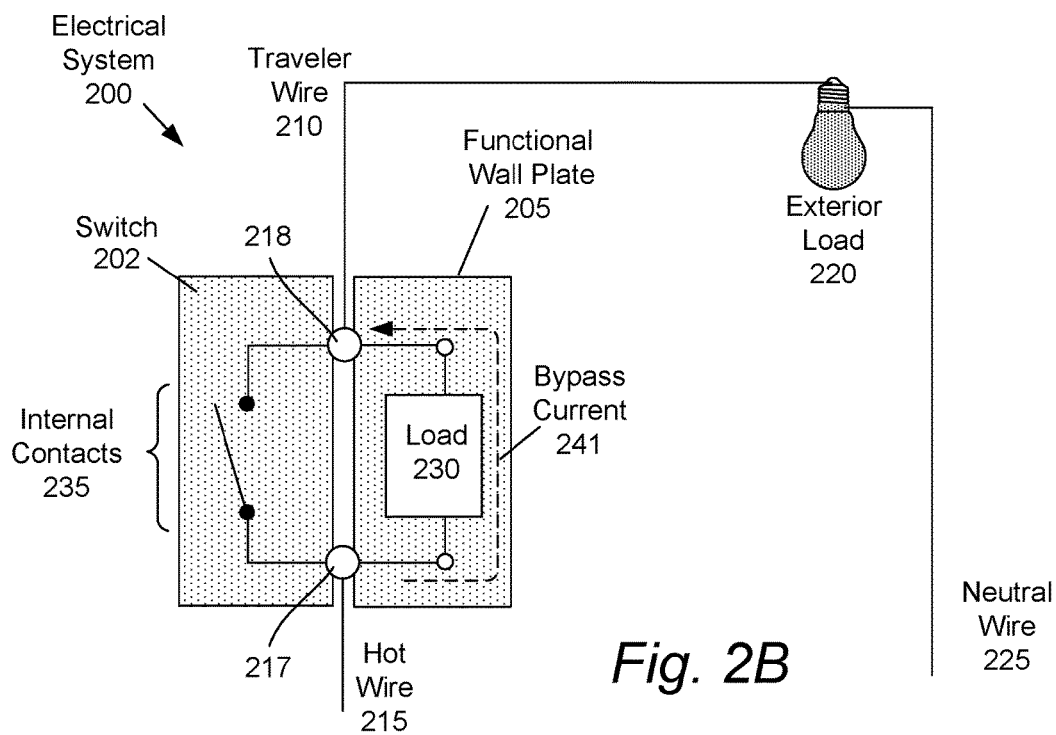

FIG. 2B is a block diagram showing an illustrative electrical system (200) for controlling a load (220) that has been modified by placing a functional wall plate (205) over the switch (202). In this example, the internal contacts (235) are open so that no current flows through the switch (202) and the light (220) is nominally OFF. This creates a voltage differential across the terminals (217, 218), with terminal A having a high voltage because it is connected to the hot wire (215) and terminal B having a lower voltage because it is disconnected from the hot wire (215) and is connected to the neutral wire (225) through the load (220).

The functional wall plate (205) contacts the terminals (217, 218) of the switch (202) to extract electrical power. Thus, in the configuration shown in FIGS. 2A and 2B, the functional wall plate can only extract power when there is a voltage difference across the terminals (217, 218). When the internal contacts (235) are closed, the two terminals are electrically connected by the internal contacts and are at substantially the same voltage. There may be a very small voltage difference between the two terminals that is related to the contact resistance of the internal contacts. Ordinarily, this small voltage difference does not provide a useful amount of current. Thus, the load (230) inside the functional wall plate (205) in the configuration shown in FIG. 2B may only have access to substantial amounts of electrical power when the internal contacts (235) are open and the switch is OFF.

The bypass current (241) passes from terminal A (217) to terminal B (218) through the load (230) in the functional wall plate (205). Thus, the functional wall plate (205) bypasses the switch (202) and independently introduces a current into the traveler wire (210) that then passes through the exterior load (220) and to the neutral wire (225). Ideally, the exterior load (220) does not react to this bypass current (241) in an undesirable manner. The bypass current (241) may deliver, for example, one watt of electrical energy to the exterior load (220). If the exterior load is a 60 watt incandescent light bulb, then there would likely be no negative effects because the bypass current is only 1/60 of the total amount of power typically consumed by the bulb. The filament in the bulb may heat slightly but there would be no flashing or significant illumination of the bulb. Similarly, if the load were an electrical motor, such as a fan motor or an air conditioning motor, one watt of electricity would be insignificant and would not cause any undesirable effects.

However, there is a significant trend toward more efficient and lower wattage light bulbs. For example, compact fluorescent light bulbs and light emitting diode bulbs typically use 70%-80% less power than an incandescent light bulb that produces about the same amount of visible light. An incandescent light bulb that consumes 60 watts of energy may be replaced with a compact fluorescent light bulb that consumes about 15 watts or a light emitting diode bulb that consumes about 12 watts. As the wattage of the load decreases, the load becomes more sensitive to the bypass current (241). In response to bypass currents, the lower wattage light bulbs may flicker, illuminate or flash periodically. This can create an undesired visual disturbance for the user, who has turned off the light and expects the light to remain off.

In the case of a functional wall plate that provides various functions that include illumination as a nightlight, the challenge is to supply adequate illumination from the functional wall plate, while preventing undesirable behavior (e.g. flashing, flickering, or illuminating in the case of lighting) of the load controlled by the light switch. For example, the functional wall plate may include one or more light emitting diodes to provide the desired nightlight illumination. In the increasingly common situation where low wattage light emitting diode light bulbs are used, the design challenge becomes very significant. The electrical designer is placed in the apparently impossible situation of being required to design a circuit that allows light emitting diodes in the functional wall plate to illuminate without the light emitting diodes in the light bulb illuminating or flashing, while the same electrical current passes through both the functional wall plate and the light bulb. This situation can be further complicated because the light emitting diodes in both the functional wall plate and light bulb may have similar operating parameters.

After significant testing, it was discovered that the compact fluorescent and light emitting diode light bulbs available on the market undesirably react to currents of one milliamp or greater. For example, at currents of one milliamp, several common compact fluorescent bulbs will flicker and light emitting diode light bulbs will brightly flash as an internal capacitor charges and discharges. However, even the lowest wattage light emitting diodes that are available for use in a functional wall plate have operating specifications that specify operating currents 1 to 30 milliamps. For example, LiteOn™ LTW-006DCG-2 is a white indicator light emitting diode in a very small package that specifies 20 milliamps of operating current consumption and a 30 milliamp maximum current consumption. This is an order of magnitude more current consumption for a single LED for a functional wall plate than would be acceptable for many low wattage light bulbs in an exterior load.

Consequently, there appears to be no solution that would allow for the desired amount of illumination to be generated without violating the strict current limits required to not flash or illuminate the overhead lights. The current and power requirements of a single LED in its designed operating range exceed the current limits for many light bulbs.

Other solutions that avoid the current restriction are possible but undesirable. For example, one solution may be to require that specific light bulbs are used in conjunction with the functional wall plate. These specific light bulbs may need to exclude most LED and compact fluorescent light bulbs. Given the energy conservation movement toward lower wattage LED light bulbs, this solution is not ideal.

Other solutions require a neutral wire to be present in the light switch receptacle box. The current passing through the functional wall plate can then pass directly into the neutral wire without going through the load. However, this solution is also undesirable. There is no physical or standards based requirements for light switch receptacle boxes to contain neutral wires. Further, running a neutral line to each light switch receptacle takes additional time and requires additional wire. Consequently, many light switch receptacles do not contain a neutral wire. Further, even if the neutral wire is present in the receptacle box, it is not easily accessible. The neutral wire, in most cases, is connected with a wire nut to other wires and stuffed in the back of the receptacle box. To gain access to the neutral wire, the light switch must be unfastened from the receptacle box and pulled forward. The neutral wire must then be identified from other wires in the box, the wire nut removed, and a connection made. The process then has to be reversed to put the assembly back together. To simply gain access to a neutral wire can be more complex for a typical homeowner than installing an entirely new light switch.

Another alternative solution for getting a nightlight in a light switch is to install an entirely new light switch with a built in nightlight or illuminated toggle/rocker. This solution is often more effort and expense than home owners are willing to take. Further, light switches that contain lighting are subject to the same constraints as other solutions, namely, either a neutral wire must be present or the light switch may use too much current and flash or illuminate a large portion of light bulbs available on the market. Thus, there is currently no acceptable solution that allows a home owner to quickly and easily install a nightlight at a light switch.

FIGS. 3A, 3B and 3C show a rear, side, and front view, respectively, of an illustrative functional wall plate (300) for a rocker or décor light switch (see e.g. FIGS. 1A, 1B). FIG. 3A shows that the functional wall plate (300) includes a face plate (305), a back plate (310), and two prongs (315) extending rearward from the face plate (305). The prongs (315) are configured to contact the screw terminals (115, 120; FIG. 1A) of the décor light switch (100; FIG. 1A). A circuit board (311) represented by the dashed shape is sandwiched between the face plate (305) and the back plate (310). The circuit board (311) is connected to the prongs by conductors (312) represented by the dotted lines. When electrical power is available at the prongs (315) (i.e. when there is a voltage difference between the prongs) the circuit board (311) can produce illumination (314). In this case, the illumination (314) extends downward from a bottom edge of the functional wall plate (300). There are a wide variety of other ways that the functional wall plate (300) could be configured. For example, the illumination may project out of different locations and/or be presented in different patterns. The illumination may be a continuous bar or may be segmented into two, three or more segments. The illumination could be produced by individual LEDs, LED filaments or other light sources. The location and size of the circuit board is just one example. In other embodiments, the circuit board may be a different size such as a simple rectangle and/or may be divided into multiple sections or may be located in other locations with respect to the wall plate. Further, the prongs may have different shapes, quantities and locations. For example, there may be two, three, four or five prongs at various locations and with various shapes on the wall plate. Several illustrative examples are described below.

FIG. 3B shows a side view of the functional wall plate (300) with the prongs (315) extending rearward from the face plate (305). FIG. 3C shows a front view of the functional wall plate (300) with the prongs (315) visible through the rectangular aperture of the face plate (305).

In general, users of functional wall plates may desire some amount of control over the light output or other functionality within the functional wall plate. For example, the user may install a functional wall plate over a light switch in an entry way and another functional wall plate over a light switch in an adult bedroom. The user may want high levels of illumination near the entry way, but lower levels of illumination in the adult bedroom. Additionally or alternatively, the user may wish to turn the illumination function off for a period of time. Further, the user may wish to perform any number of other operations, including changing the color or color temperature of the illumination. It may be assumed that a small switch mounted on the circuit board could be used to perform any or all these functions. However, because the circuit board input is the line voltage, the small switch on the circuit board would be required to withstand line voltages. For example, when the circuit (311) is providing illumination (314) and current is flowing through the circuit, the voltage differences across the small switch may be minimal. However, when the small switch interrupts the current flow, the voltage difference across the small switch can rise substantially. In many designs, when the switch is in the OFF state, the voltage difference across the small switch is substantially similar to the voltage difference across the prongs. Small switches are not typically capable of withstanding the line voltage of the building wiring and transient voltage spikes related to connecting and disconnecting loads. Voltages of this magnitude may arc across the internal contacts of these small switches. Switches that are built to withstand hundreds of volts can be far too large and expensive to be accommodated into a functional wall plate. Specifically, a switch that is capable of withstanding line voltages and transients is best represented by the light switch the functional wall plate is mounted to.

However, included in this embodiment is a switch (320) that provides for manual control of the nightlight function of the functional wall plate (300). This switch is very small and has the capability of controlling/stopping current flow through the circuit but can only tolerate voltage across its terminals much lower than the high applied line voltages. The switch fits in between the face plate (305) and back plate (310) without causing any change to the profile of the functional wall plate. The switch (320) also includes a cover/handle that extends slightly above the surface of the face plate so that the switch can be manipulated. The switch (320) may have any of a number of configurations, including, but not limited to, an ON/OFF operation, a multi-illumination level operation, a dimming operation, a light color changing operation, wireless networking, or other function. Various embodiments of this switch and wall plate are described below.

FIGS. 4A, 4B and 4C show a front, side, and rear perspective view, respectively, of an illustrative functional wall plate (400) for a toggle or standard light switch (see e.g. FIGS. 1C, 1D). FIG. 4A shows a front of the functional wall plate (400), including the face plate (405) and the switch (420) in the lower left corner of the face plate. FIG. 4B shows a side view of the functional wall plate (400) with prongs (415) extending rearward from the wall plate. FIG. 4C shows that the functional wall plate (400) includes a face plate (405), a back plate (410), and two prongs (415) extending rearward from the face plate (405). The prongs (415) are configured to contact the screw terminals (172, 175; FIG. 1D) of the toggle light switch (150; FIG. 1D). The prongs (415) include insulating hoods (415) and contact surfaces (422). The insulating hoods (415) provide for smooth installation and prevent undesired electrical contact with surrounding conductors when the wall plate is installed over the switch (150, FIG. 1C). The contact surfaces (422) are configured to contact the screw head or other conductors of the side screw terminals (172, 175; FIG. 1D) on the light switch.

Figure 5:
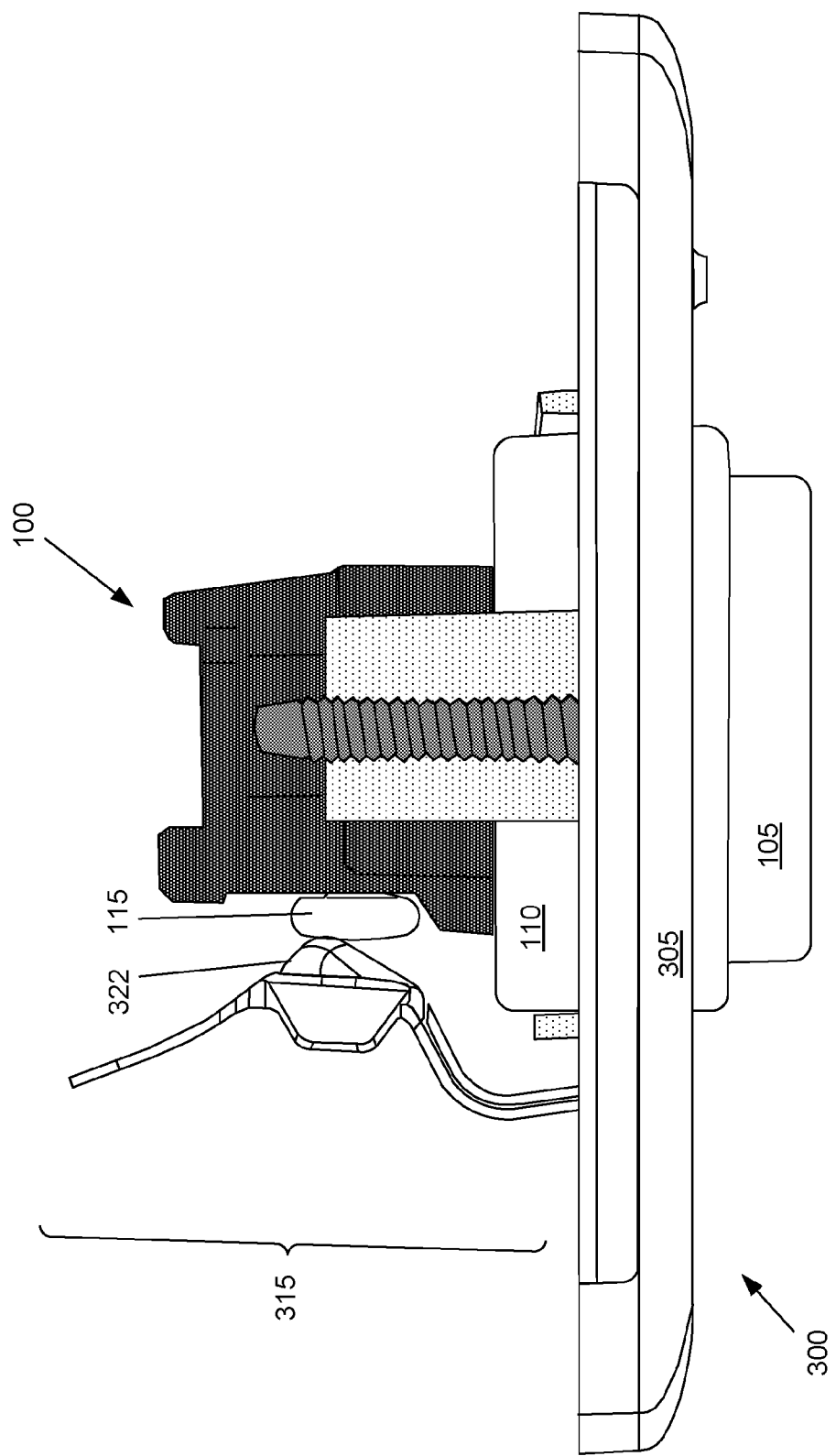
FIG. 5 shows a functional wall plate installed over a light switch, according to one example of principles described herein.

FIG. 5 is an end view of a functional wall plate (300) installed over a décor switch (100). The faceplate (305) of the functional wall plate fits around the rocker (105) of the light switch (100). The prongs (315) extend rearward around the shoulder of the switch body (110) so that the contact surfaces (322) electrically contact the screw terminals (115). The contact between the contact surfaces (322) and the screw terminals (115) supplies electrical power to the circuit in the functional wall plate (300). This is only one example of a technique for extracting power from the switch or wiring. A variety of other techniques could also be used. For example, the wall plate may have wires with a stripped portion or spade connectors that could be attached to the screw terminals on the switch or directly to the wiring that supplies electrical power to the switch.

The previous examples are directed to single pole switches that have two screw terminals for connection of hot and neutral wires and one additional screw terminal for connection of a ground wire. These single pole switches are used where only one switch controls the exterior load. In situations where multiple switches control the load, multi-pole switches are used. For example, three-way and four-way switches are used in rooms with multiple entrances, such as hallways, stairways, and larger rooms. One light switch is located at each entrance so that a user entering from any entrance can control the overhead lights. The electrical system is configured so that changing the state of any switch results in a change in the load state. Thus, if the electrical load includes lights, the lights can be turned ON or OFF from any entryway/switch.

Figure 6A:
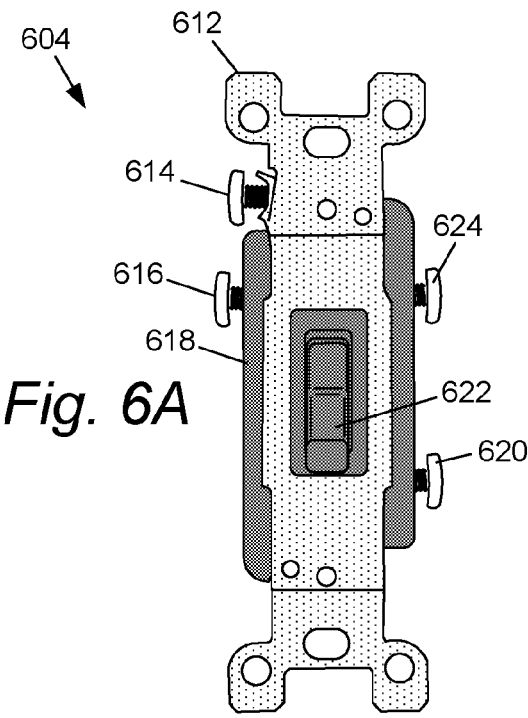
FIGS. 6A and 6B are front views of multi-pole light switches, according to one example of principles described herein.

FIG. 6A is a front view of an illustrative three-way switch (604). This three-way switch (604) includes a body (618), and a yoke/mounting bracket (612) attached to the body. A ground screw terminal (614) is connected to the bracket (612). The bracket (612) also includes various apertures and threaded holes for mounting of the switch to an electrical box and for mounting a face plate over the switch. The switch (604) also includes three screw terminals (616, 620, and 624). These screw terminals allow electrical wires to be mechanically fastened and electrically connected to the switch. A toggle (622) allows the user to mechanically change the position of internal contacts to change the electrical configuration of the switch. For example, in a first configuration a first screw terminal (624) may be electrically connected to a second screw terminal (620). However, when a user mechanically moves the toggle upward to a new location, the internal contacts are reconfigured to connect the first screw terminal (624) to a third screw terminal (616).

This is just one embodiment of a three-way switch. A variety of other three-way switch configurations may also be used in conjunction with the principles described. For example, the three-way switch may have a rocker rather than a toggle, or the wiring may be connected to stab in connectors on the rear of the switch body rather than directly to the screw terminals. The three-way switch and other switches described herein may also include various sensors and actuators. For example, the switches may include motion detectors and/or actuators to remotely/automatically control the loads/lights connected to the switch.

Figure 6B:
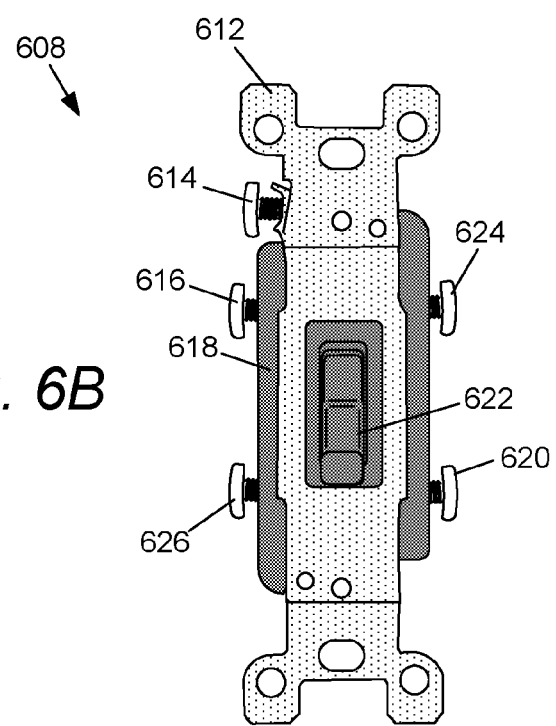

FIG. 6B is a front view of an illustrative four-way switch (608). The four-way switch may include many of the same features as a three-way switch. For example, this four-way switch (608) includes a body (618), and a yoke/mounting bracket (612) attached to the body. A ground screw terminal (614) is connected to the bracket (612). However, in additional to the three screw terminals (616, 620, 624), the four-way switch (604) also includes a fourth screw terminal (626). Although the toggle (622) allows the user to mechanically change the electrical configuration of the switch, the internal contacts are different than in a three way switch. In this example, in a first configuration a first screw terminal (624) may be electrically connected to a second screw terminal (620) and the third screw terminal (616) may be connected to the fourth screw terminal (626). However, when a user mechanically moves the toggle upward to a new location, the internal contacts are reconfigured to connect the first screw terminal (624) to the fourth screw terminal (626) and the third screw terminal (616) is connected to the second screw terminal (620).

Examples of electrical systems that include three-way and four-way switches are given below. Unlike single pole switches shown and described in FIGS. 1A-5, these multi-pole switches do not have a preferred orientation. For single pole switches, it is standard practice to mount the switches so that moving the toggle upward turns the light ON and moving the toggle downward turns the light OFF. Mounting a single pole light switch upside down would result in counterintuitive operation for the user. Because single pole light switches have a consistent mounting configuration, the location of the screw terminals is also fairly consistent (typically on the right of the switch when facing the front of the switch). Thus, the two prongs on functional wall plates intended for use with single pole switches (see e.g. FIGS. 3A, 3B, 3C, 4A, 4B, 4C, 5) can be located to consistently contact the screw terminals. However, for three-way and four-way switches, simply repositioning the toggle/rocker of any switch in the electrical system will change the state of the load/lights. Thus, three-way and four-way light switches can be mounted upside down or right side up without interfering with the user's operation. This makes the locations of the screw terminals less predictable.

Further, as the configuration of the electrical system changes as a result of users reconfiguring various light switches, the interconnections between the various screw terminals changes. A pair of screw terminals that can supply electrical power to a functional wall plate in a first configuration may not be able to supply electrical power in a second configuration. Thus, for a functional wall plate to reliably receive electrical power, the functional wall plate should be configured to contact multiple screw terminals and select the screw terminals that have electrical power for a given configuration.

FIG. 6C shows a functional wall plate (630) that includes four prongs (A, B, C, D) and is configured to be compatible with both three-way and four-way light switches. When the wall plate (630) is placed over a three-way switch, one of the prongs will not connect with a screw terminal. For example, the wall plate (630) may be placed over the three-way switch (604, FIG. 6A) and prong A may contact the first screw terminal (624), prong B may contact the second screw terminal (620) and contact C may contact the third screw terminal (616). Prong D will rest on the body (618) of the switch (604) and will not make contact with a screw terminal. If the three-way switch (604) is mounted upside down, prong A will contact the second screw terminal (620), contact B will contact the first screw terminal (624) and prong D will contact the third screw terminal (616) with prong C resting on the body (616) and will not make contact with a screw terminal. Thus, this configuration, which includes more prongs on the functional wall plate than there are terminals on the light switch accommodates multiple light switch mounting orientations.

For four-way switches, the prongs (A, B, C, and D) of the functional wall plate (630) may contact all four of the screw terminals when the light switch is mounted upside down or right side up. However, there is no requirement that each of the prongs make contact with a screw terminal. The functional wall plate can extract power from the light switches as long as there is a voltage difference between the screw terminals that will support electrical current flow.

FIG. 6D shows an alternative configuration of a functional wall plate (632). In this configuration a fifth prong (E) has been added to the other prongs (A, B, C, and D). This prong will make electrical contact with the ground screw terminal. FIG. 6E shows a rear view of the plate (632) installed over a four way switch (608). For purposes of illustration, electrical wires are not shown connected to the screw terminals, but are assumed to be in place. In this example, prong A may contact the first screw terminal (624), prong B may contact the second screw terminal (620) and contact C may contact the third screw terminal (616), and prong D may contact the fourth screw terminal (626). Prong E contacts the conductive bracket (612) that is electrically connected to a ground screw terminal (614).

In general, a functional wall plate for installation over a multi-pole light switch may include a face plate and at least three prongs extending rearward from the faceplate to electrically contact terminals of the multi-pole switch. A circuit in the functional wall plate is connected to and draws power from the prongs. However, as discussed above, there may not be a voltage difference between all of these prongs that will support electrical current flow. Thus, the circuit in the functional wall plate will have to select or reselect the screw terminals that have a voltage difference each time the electrical system is reconfigured. Various configurations of electrical systems that include multi-pole switches are described below and illustrate that as the switch configurations are changed, the distribution of available electrical power between the screw terminals also changes.

Figure 6F:
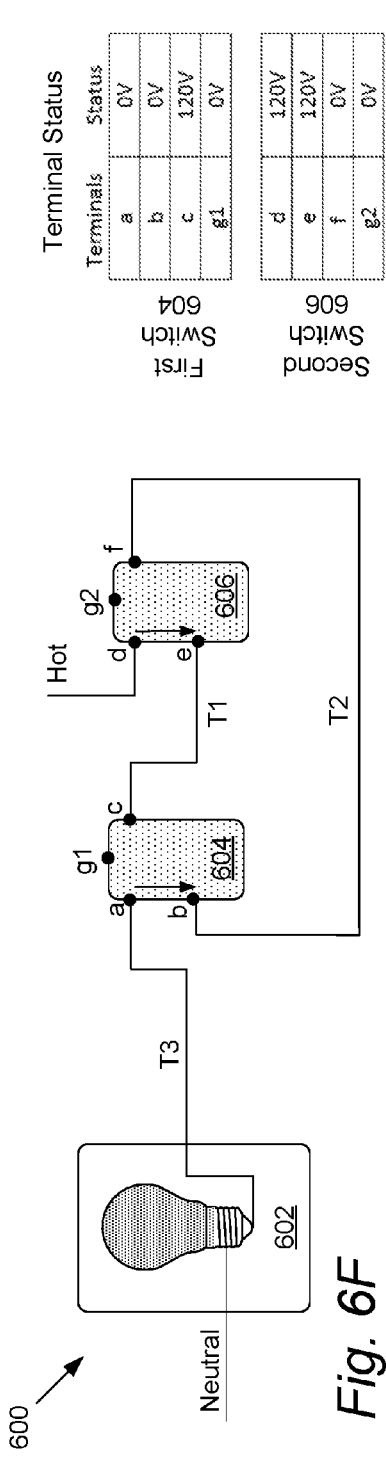
Figure 6G:
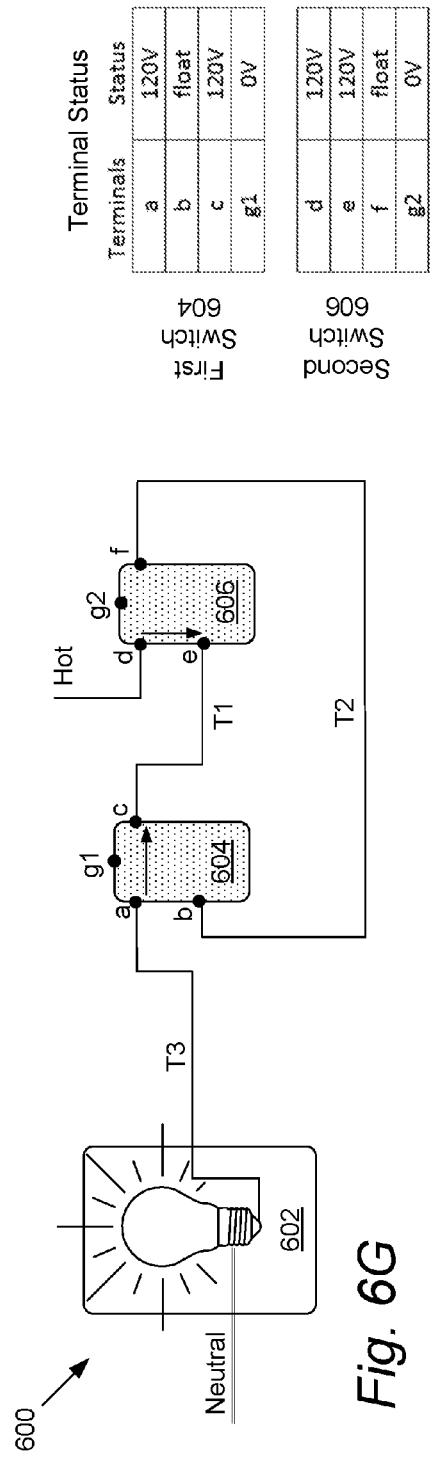

FIGS. 6F, 6G, and 6H are diagrams of an illustrative electrical system (600) that includes a load (602) and two three-way switches (604, 606). For example, this electrical system may be used in a stairway, with one three-way switch (e.g. 604) located at the bottom of the stairs and one three-way switch (e.g. 606) located at the top of the stairs. This allows a user to turn the lights ON or OFF from either the top or bottom of the stairs. Included in these figures are charts indicating the status of terminal voltage with respect to the neutral wire according to the illustrated switch configurations. To aid in the illustration, the line voltage is indicated to be 120 volts.

FIG. 6F shows the load (602) in an OFF state because the load is disconnected from electrical power by the configuration of the three-way switches (604, 606). The first three-way switch (604) includes three switched terminals (a, b, and c). The second three-way switch (606) also includes three switched terminals (d, e, and f). Ground terminals (g1, g2) may also be present but do not participate in the switching behavior of the switches. Terminal d of the second three-way switch (606) is connected to the hot wire, which supplies power to the electrical system (600). Terminal e is connected to terminal c by traveler T1. Terminal f is connected to terminal b by traveler T2. Terminal a of the first switch (604) is connected to the load (602) by traveler T3.

The load (602) is in the OFF state because there is no connection between the incoming hot wire connected to terminal d and the traveler T3. Specifically, the internal switching mechanism of the second three-way switch (606) as represented by the arrow inside the switch (606), connects terminal d to terminal e. Terminal e is electrically connected to terminal c by T1 and delivers electrical power from the hot wire to terminal c. However, the first three-way switch (604) does not make a connection with terminal c. Instead, the first three-way switch (604) connects terminals a and b. Thus, because there is no connection between the hot wire and the load (602), the load does not receive electrical power through the switches and will remain OFF until the state of either of the three-way switches is changed.

For a functional wall plate to extract power from a switch there should be at least one screw terminal that can supply electrical current to the functional wall plate and at least one screw terminal that provides an electrical path for the electrical current to flow to neutral or ground.

The chart to the right of the circuit diagram shows the status of the various terminals. For the first three way switch (604), there are four terminals (a, b, c and g1). Terminals a and b have zero volts relative to the neutral line voltage because they are connected to the neutral line through the load, with no current flowing through the load. Terminal c is connected to the hot line voltage (for example, 120V) through terminals e and d. In these examples, the hot line voltage is indicated to be 120 volts alternating current ("120V"), but it could be any voltage used in the electrical system to supply power to the load. For example, other voltages could be 12 volts direct current, 100 volts alternating current, 240 volts alternating current, 277 volts alternating current, etc. The voltage on the ground terminal g1 is assumed to be at the same potential as the neutral wire and will be indicated as 0V with respect to the neutral wire. Thus, only a subset of the screw terminals (specifically, terminal c) can supply electrical current in this configuration. This subset of screw terminals that can supply electrical current changes as the configuration of the switches change. The subset of screw terminals that can sink electrical current also changes as the configurations of the switches change. This is illustrated in the figures and descriptions below.

For a functional wall plate connected to terminals of the first switch in the configuration shown in FIG. 6F, one prong could be connected to terminal c to accept electrical current. This electrical current could pass through the functional wall plate circuitry and out to any of terminals a, b, or g1. Current passing through terminals a and b would pass through the load (602) and current passing through g1 would pass directly to ground without passing through the load.

For the second three way switch (604), there are four terminals (d, e, f, and g2) Terminal f has zero volts with respect to the neutral line voltage because it is connected to the neutral line through the load, with no current flowing through the load. Terminals d and e are connected to the hot line voltage (120V). The voltage on the ground terminal g1 is 0V. Thus, for a functional wall plate connected to terminals of the second switch in the configuration shown in FIG. 6F, one prong could be connected to either terminal d or terminal e to accept electrical current. This electrical current could pass through the functional wall plate circuitry and out to any of terminals f and g2. Current passing through terminal f would pass through the load (602) and current passing through g2 would pass directly to ground without passing through the load.

FIG. 6G shows a second configuration of the electrical system (600) in which a user has changed the configuration of the first switch (604) to turn the light (602) ON. This change in configuration is shown by the change in the orientation of the arrow inside of the first switch (604). The arrow is used for purposes of illustration of the connection between the various terminals and does not indicate a current flow or a direction of current flow. The light or other load (602) receives electrical power from the hot wire, through terminal d and e of the second switch, along traveler T1 and through terminals c and a in the first switch. This allows electrical current to pass through traveler T3 and into the load (602) and out to the neutral line.

The chart to the right of the circuit diagram in FIG. 6G shows the voltages at the various terminals. The voltage on terminals a and c of the first switch (604) are at the line voltage (120 V) while terminals b, f, and traveler T2 are not connected to a current source or sink. Thus, terminal b, f, and T2 are disconnected from the remaining functional circuitry and "float" or in other words cannot sustain substantial current flow. The ground g1 is capable of acting as a current sink (0V). Thus for a functional wall plate to extract power from the first switch (604), it can accept current from either terminal a or terminal c, and sink the current to ground g1 for the situation where the light is ON.

The situation is similar for the second switch (606). Terminals d and e are at 120V (with respect to neutral) and are connected to the hot wire, while terminal f is floating and ground g2 is at 0V. To supply power to a functional wall plate, power can be sourced from either or both of terminals e and d and sunk into the ground terminal g2.

FIG. 6H shows a third configuration where a user has changed the configuration of the second light switch (606) to turn the light off. In this situation, the function wall plate can again source power from terminals having 120V and sink power into terminals connected to the neutral through the load (602) or to ground terminals or a combination of both. However, the subset of terminals available to act as a source of current and the subset of terminals available to act as current sinks is different than any of the other configurations. Specifically, for the first switch the terminal b is the current source and any other terminal may be used as a current sink.

For the second switch, either of terminals d and f may be current sources and terminals e and g2 may act as current sinks. Consequently, it is clear that a functional wall plate will need to have some ability to dynamically steer current from terminals which current sources to terminals which are current sinks as the configuration of the electrical system (600) changes.

The examples of electrical systems given above are only illustrative. There may be any of a number of other configurations that could be used. For example, the electrical system could incorporate more or less switches or loads. FIG. 6I shows an electrical system (610) that includes the first three-way switch (604) and the second three-way switch (606) as shown above, but also includes a four-way switch (608). In the configuration shown in FIG. 6I, the light is OFF. Changing the position of any one of the switches will change the state of the light/load (602). The electrical status of each of the terminals is shown in the chart to the right of the electrical diagram. In this example, the four-way switch (608) includes four active terminals (g, h, i, j) and one ground terminal g3. Terminals g and h are connected to the hot wire through traveler T5 and terminals d and f in the second switch. Terminals i and j are connected to the neutral wire through traveler T6, terminals a and c of the first switch, traveler T8 and the load (602). As shown in the chart to the right, a functional wall plate could extract electrical current from either or both of g and h and sink the current through the load through either i or j or g3.

FIG. 6J shows another configuration of the electrical system (610) where the user has changed the configuration of the four-way switch (608) to turn the light (602) ON. Electrical power passes from the hot wire to the load through the following elements in sequential order: terminals d and f of the second switch (606), traveler T5, terminals h and i in the four-way switch (608), traveler T6, through terminals a and c of the first switch (604) and along traveler T8. As shown in previous examples, functional wall plates placed over these switches can extract power from terminals connected to the hot wire and sink electrical power to the grounds.

FIG. 6K shows the same system in a different configuration where the user has turned the light OFF by reconfiguring the internal contacts of the first switch (604). Specifically, the user disconnected terminals a and c and connected terminal a to terminal b. This broke the current path to the load (602). Turning to the chart on the right of the electrical diagram, a functional wall plate could extract electrical power from any terminal with 120 V and sink to any terminal with 0V.

As noted above, the electrical systems illustrated are only examples. The principles described can be applied to a wide range of electrical systems. For example, the principles may be applied to more complex electrical systems and include more switches. For rooms with more than three entry points, additional four-way switches may be used between the two three-way switches. This configuration preserves the ability to change the state of the load by changing the internal configuration of any of the switches in the electrical system.

FIGS. 7A-7E are examples of illustrative current steering blocks (700, 704, and 706). As illustrated above, there may be any number of terminals associated with a switch. In this example, the connection of a prong or other device to a screw terminal or other conductive portion of a switch is called a "source node." In a first configuration, there may be a number ("n") source nodes with only a subset of those nodes being capable of supplying current flow to a functional wall plate circuit and only a subset of nodes that are capable of sinking/accepting current flow from the circuit. These subsets may change as the configuration of the electrical system changes. Thus, there is a need for the circuit to automatically select the correct subsets of source nodes. Further, every source node must be electrically isolated from every other node such that electrical current cannot flow directly between nodes. In one embodiment, the only current that is permitted to flow between source nodes by the functional wall plate is the controlled current that passes through the internal circuitry of the functional wall plate.

Figure 7A:
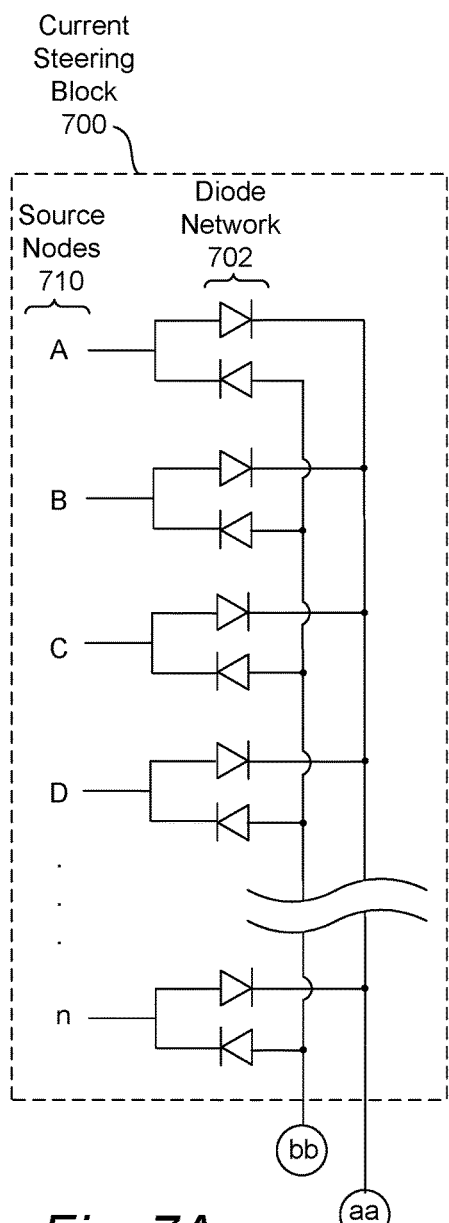
FIGS. 7A-7C are examples of illustrative current steering blocks, according to one example of principles described herein.

FIG. 7A is a generalized diagram of a current steering block (700) that selects source nodes (710) that are capable of sustaining current flow through the functional wall plate circuit and electrically isolates each source node from every other node. There is a set of source nodes (710) that are represented as a series of letters (A, B, C, D . . . n). There may be n nodes, where n may be any positive integer. For example there may be 2, 3, 4, 5 or more nodes created by contact between a functional wall plate and terminals of a switch. The current steering block (700) connects these source nodes (710) to a diode network (702). The diode network (702) serves to isolate each of the source nodes from every other node by preventing current from any node from passing directly into any other node. In this example, the current steering block has an input node ("aa") and an output node ("bb"). The current steering block (700) steers current from a selected source node to the input node aa. The input node aa is connected to the rest of the functional wall plate circuitry (see e.g. 705, FIG. 7B). The output node bb accepts current that has passed through the other portions of the functional wall plate circuitry. The current steering block (700) then routes the current to a source node (710) that is connected to a current sink (e.g. a source node that can pass current to a ground, to a load connected to a neutral, or to directly to a neutral).

Figure 7B:
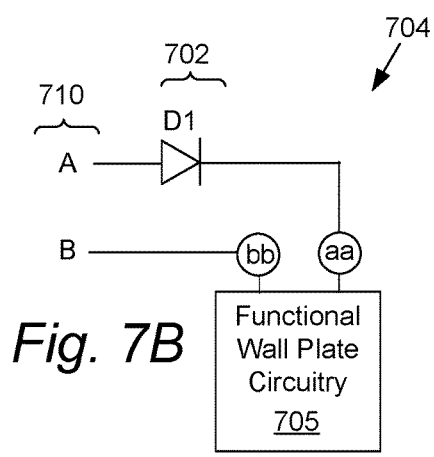

The current steering block (700) may take a variety of different configurations. In FIG. 7B, the current steering block (704) includes only two source nodes (710). The diode network (702) includes only one diode in this example. Nodes aa and bb are connected to rest of the functional wall plate circuitry (705). The current steering in this simple implementation includes blocking voltage with the wrong polarity from entering the circuitry (705) and forcing current to pass into the input node aa, through circuitry (705) and returning from output node bb. Specifically, when connected to a direct electrical current source, the diode D1 ensures that the direct electrical current source is connected with the correct polarity. If the wrong polarity is used, D1 will block the electrical current from flowing into the circuitry (705) to protect it. If connected to an alternating current source, the diode D1 only allows current of one voltage polarity to pass into the circuitry (705).

The source nodes A and B are isolated from each other because, for current to pass between node A and node B, the current must first pass through the circuitry (705). The circuit in FIG. 7B and other illustrative examples shown herein may accept electrical power from alternating electrical current sources or direct electrical current sources.

Figure 7C:
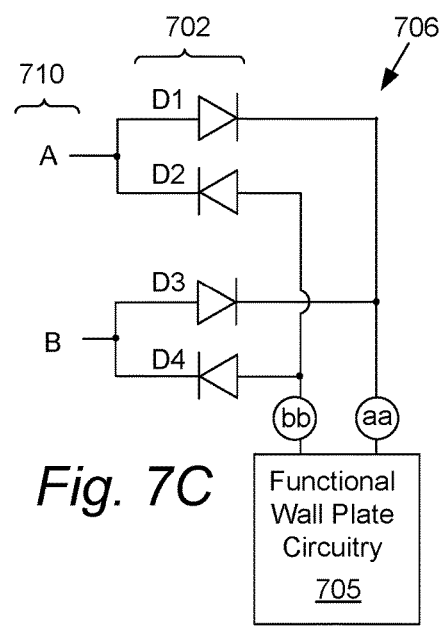

FIG. 7C shows a current steering block (706) with only two source nodes (A and B). The current steering block (706) is connected to a functional wall plate circuit (705) through input node aa and output node bb. The diode network (702) provides power to the functional wall plate circuitry (705) by steering positive current flow from either node A or node B to input node aa. A full-wave rectifier converts the whole of the input waveform to one of constant polarity (positive or negative) at its output.

Figure 7D:
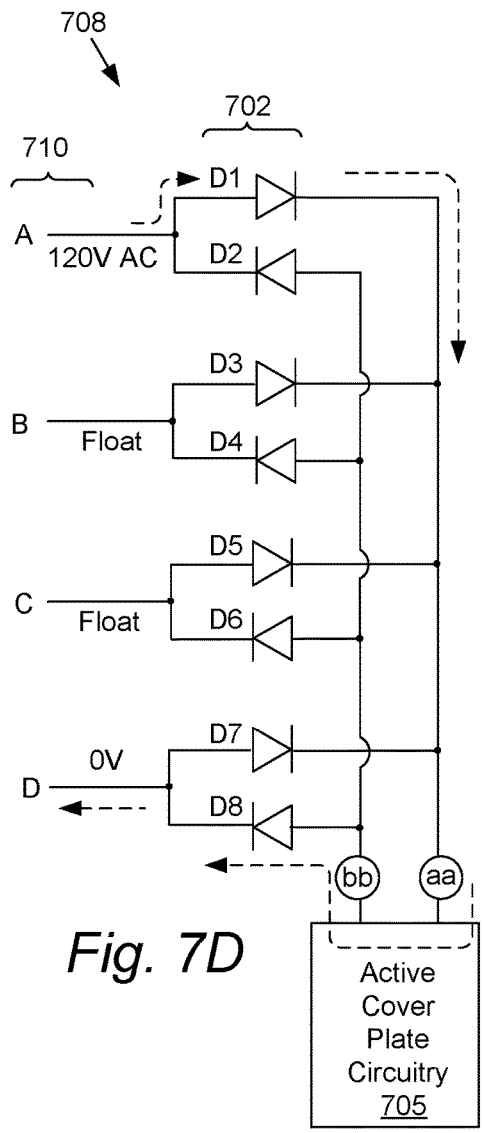
FIGS. 7D and 7E show the operation of a current steering block, according to one example of principles described herein.
Figure 7E:
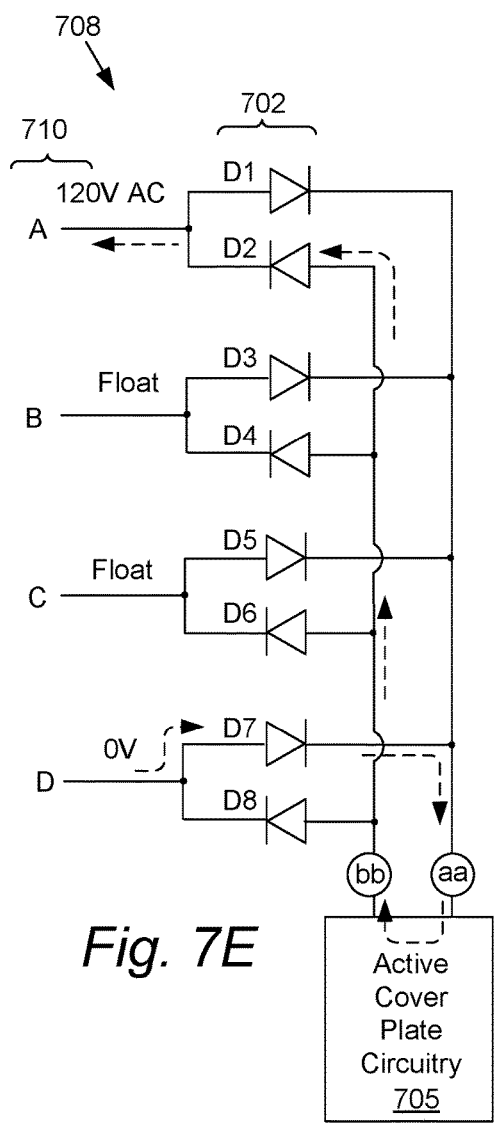

FIGS. 7D and 7E show the operation of a current steering block (708) that includes n=4 source nodes (710). In this example, only two of the four nodes are "active" nodes that are capable of sustaining current flow. The active nodes were selected arbitrarily to illustrate how the current steering block (708) both isolates the various nodes from each other and steers current to the input node aa. In this example, node A has 120V AC and is capable of acting as a current source. Conventional notation for current flow is used throughout the description. Nodes B and C are floating and incapable of acting as either sources or sinks of current. Node D is has a voltage of 0V and is connected to either a ground or neutral. This allows node D to act as a current sink.

When a forward bias voltage is applied to a source node that is greater than the built in potential of the diodes connected to the source node, the diodes allow current to flow through the diode. For floating nodes, this current flow is minuscule but allows for the current steering block to limit the voltages on the floating lines. If there is both a current source node and a current sink node connected to the diode network, the diodes allow for current to pass into the input node aa and out of the output node bb.

FIG. 7D shows a positive voltage cycle of a 120V AC electrical source connected to source node A. The diode D1 allows the electrical current (indicated by the dashed arrows) to pass through it and to the input node aa. Although diode D1 is connected to each of the other source nodes through other diodes, these diodes block the current from passing directly to the other source nodes. Specifically, the output of diode D1 is connected to the output of diodes D3, D5 and D7. However, these diodes prevent the flow of electrical current backwards to source nodes B, C, and D. This isolates source nodes B, C, and D from source node A and will similarly isolate each source node from every other source node.

The electrical current flows through input node aa, through the functional wall plate circuitry (705) and out the output node bb. The functional wall plate circuitry (705) limits the amount of current that can flow. As discussed above, this limitation on the current mitigates the potential adverse behavior of external loads connected to the switch. As the electrical current passes out of output node bb, it has the right polarity to pass through any of diodes D2, D4, D6, and D8. However, diode D2 has a high positive voltage on the opposite side and consequently the electrical current cannot generate sufficient voltage across diode D2 to pass through to source node A. Source nodes B and C are floating and cannot accept a significant amount of current flow before their voltage potential rises and prevents further flow. The current sink connected to source node D allows for the current to pass through diode D8 and source node D and into the current sink, which may include an electrical neutral, an electrical ground, or exterior electrical load connected to a neutral or ground.

FIG. 7E shows a negative voltage cycle of a 120V AC electrical source connected to source node A. During the negative portion of the AC cycle, the voltage of source node A drops to negative voltage potentials and draws electrical current from node D, through diode D7 and through the functional wall plate circuitry (705). The current passes out of input node aa, through the circuitry, and into the output node bb, and upward toward diode D2. At this point the electrical current can access any of the nodes through their respective diodes, but only source node A can sustain a forward voltage drop across diode D2 to allow significant current to flow.

Thus, the current steering block (700, 704, 706, and 708) includes a diode network (702) and n source nodes (710) that are connected to the diode network. The current steering block also includes an input node aa, with current sourced from any source node steered into input node aa. From there the current flows into/through the other blocks of the functional wall plate circuitry. The current steering block also includes an output node bb, where current passing out of other blocks in the functional wall plate pass into the output node bb and is steered toward a source node connected to a current sink.

As discussed above, electrical current that passes through the functional wall plate circuitry may pass into output node bb and be steered to a source node that is connected to an external load and neutral wire. To avoid undesirable behavior of the load, the amount of current passing through the load should be below the threshold for the load to respond. However, in some situations, it may be desirable for the load to respond. For example, if the functional wall plate contains a motion detector, it may be desirable for an overhead light to illuminate at some level when motion is detected. This will provide illumination to the surroundings and allow the user to perform their desired action or find the light switch and turn it on for additional illumination. This may be accomplished by sending a controlled amount of current to the load (a light in this case) that elicits the desired response (i.e. dim or full illumination) from the load.

As discussed above, it may be desirable in some situations for the electrical current passing through the functional wall plate to sink to an electrical ground. This will allow the functional wall plate to be powered even when the external load is ON. For example, if the functional wall plate circuitry is connected to ground through a source node, there will be a voltage difference between any terminal electrically connected to the hot wire and the electrical ground. Examples of situations where this can be advantageous are shown in FIG. 6G and FIG. 6J, where the light is ON and none of the active nodes can sink current. Specifically, electrical power will be available to the functional wall plate circuit even when the light is ON if a connection is made to ground. However, ground is typically used as a safety mechanism. If there is a malfunction in the electrical system that electrifies conductive parts on the switch, the electrical ground conducts this electricity away from the user.

Figure 8A:
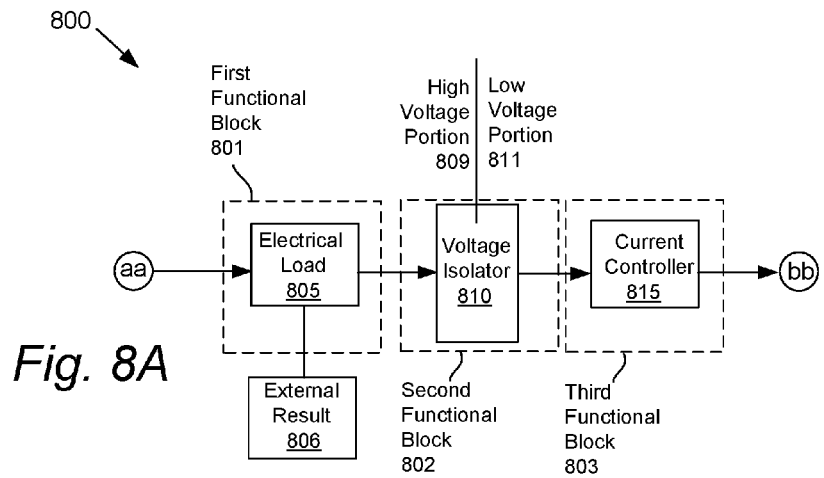
FIGS. 8A-8C are diagrams of illustrative limited current electrical circuits for functional wall plates, according to one example of principles described herein.

FIG. 8A is a diagram of an illustrative electrical circuit (800) for functional wall plates. In this example, the circuit (800) may interface with the current steering block by connecting with the input node aa and the output node bb. In this example, the circuit (800) includes a first functional block (801) that includes an electrical load (805). The first functional block (801) is connected to input node aa. A second functional block (802) includes a voltage isolator (810) that accepts current that passes through the electrical load (805). A third functional block (803) includes a current controller (815) that is connected to output node bb. The arrows connecting the blocks conceptually illustrate the generalized flow of current between the circuit elements starting at the input node aa and passing sequentially through the circuit to output node bb.

As discussed above, various light bulbs are sensitive to current flow that passes through the functional wall plate, bypassing the switch, and into the load. For example, some light bulbs may exhibit undesirable behavior with 1 milliamp of current flow, while a subset of those light bulbs may be sensitive to 0.5 milliamps of current flow and an even smaller subset of light bulbs may be sensitive to 0.25 milliamps of current flow. As discussed above, these amounts of current flow are several orders of magnitude lower than the operating current of very small indicator LEDs. To increase the compatibility of the circuit with a wide range of light bulbs, one goal for the circuit (800) is to very efficiently utilize and minimize the amount of current flow through the circuit (800). One technique employed by this circuit to be efficient and minimize the current flow is to "reuse" the current, or in other words, current that enters the circuit flows sequentially through the various circuit blocks before exiting the circuit.

In many circuits, the various components are arranged in parallel between an electrical source and an electrical sink. Current that is accepted by one circuit block from the electrical source exits to the electrical sink without entering the other circuit blocks. This provides stability and isolation of the various circuit blocks. The electrical consumption of one block does not directly influence the amount of current or electrical power available for another block. For example, a microprocessor may control a number of external modules. However, the microprocessor has its own stabilized power supply that is independent of the current flowing through the controlled external modules. Thus, if a module draws more or less current during operation, the microprocessor does not have to accept this changing amount of current.

However, in the circuit embodiments shown herein the opposite is true. Every component block accepts the current from the previous block, along with any modifications to the voltage levels made by the previous block. This reduces the amount of current flow by "reusing" it in all the circuit blocks.

First, the electrical load (805) accepts the current from input node aa and utilizes this current to perform an external result (806). The external result (806) may include any user desired function. For example, the external result (806) may include a variety of functions such as providing illumination, sensing environmental parameters, heating or cooling, mechanically actuating or other functions.

Next, a voltage isolator (810) accepts the current from the electrical load (805) and isolates the components downstream from high voltage while still passing the same current to the current controller (815). The voltage isolator (810) divides the circuit into two sections, a high voltage portion (809) to the left and a low voltage portion (811) to the right. The high voltage portion (809) includes the electrical load (805) and the low voltage portion (811) includes the current controller (815). The voltage isolator (810) may have a number of characteristics that make it especially suited for this application. For example, the voltage isolator (810) may efficiently accept a wide range of input voltages and output a limited voltage while allowing the current flow to pass through the voltage isolator (810) from the high voltage portion (809) to the low voltage portion (811).

Thus, in one embodiment, the electrical circuit (800) includes a first functional block (801) with an electrical load (805) to produce an external result (806), a second functional block (802) with a voltage isolator (810), and a third functional block (803) that includes a current controller (815). The first, second and third functional blocks (801, 802, 803) can be connected such that the external result (806) of the electrical load (805) is configured to be determined by the current controller (815) acting through the voltage isolator (810). For example, the current controller (815) may limit the amount of current passing through it and consequently limit the amount of current passing through the entire circuit. This limits the amount of available current passing through the electrical load (805). This may influence the magnitude or action of the external result (806). In one embodiment, the electrical load (805) includes a light source, and the amount of current flowing through the light source determines the amount of light output (the external result) by the light source. Thus, the current controller (815) can influence the light output even though it is separated from the electrical load (805) by the voltage isolator (810) and is operating at lower voltage than the electrical load (805). As discussed above, the voltage isolator (810) is configured to limit a maximum voltage across the current controller (815).

The example given above is only one illustrative embodiment. A variety of other circuit configurations could also be used. For example, the functional blocks may include additional blocks, devices, or functions. In one example, the third functional block (803) may include a number of additional modules and functions such as wireless transmitters, sensors, processors or other devices. Further, the voltage isolator (810) may include automatic sensing and switch behavior to regulate the voltage under different levels of current flow. In some embodiments, the voltage isolator (810) may be a single component. In other embodiments, there may be additional elements interposed in the sensing portion to supply a stable reference voltage.

An example of a voltage reduction system that does not provide for passing a substantial portion of the current from one side to another is a transformer. A transformer is an electrical device that transfers electrical energy between two separate circuits through electromagnetic induction. A varying current in the transformer's primary winding creates a varying magnetic flux in the transformer core and creates a time varying electromotive force in a secondary winding. One of the advantages of transformers is electrical isolation between the primary and secondary windings. No current flows between the primary and secondary windings. The disadvantages of a transformer in the present circuit include the transformer's large cost, complexity in managing the current flows in the primary and secondary windings, and energy loss.

Figure 8B:
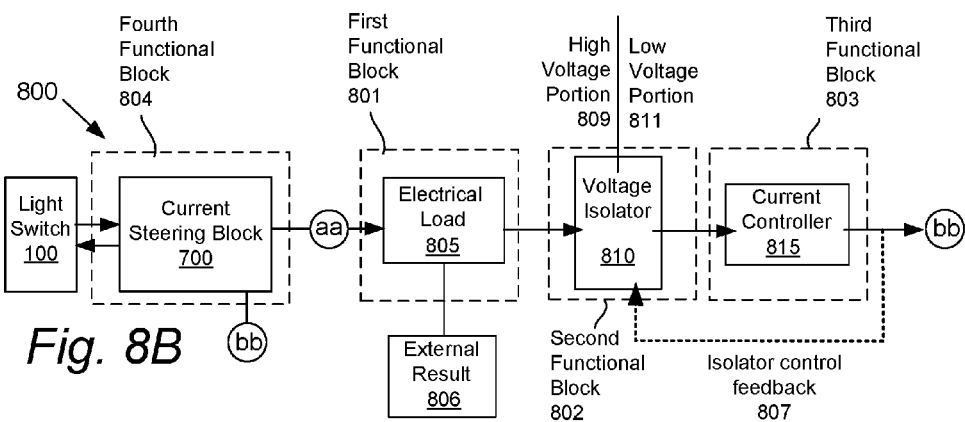

FIG. 8B shows another embodiment of the electrical circuit (800) that includes a first functional block (801) with an electrical load (805) to produce an external result (806). A second functional block (802) includes a voltage isolator (810) and a third functional block (803) that includes a current controller (810). The first, second, and third functional blocks (801, 802, 803) are connected such that the external result (806) of the electrical load (805) is configured to be determined by the current controller (815) acting through the voltage isolator (810). However, in this embodiment a fourth functional block (804) is also included in the circuit (800). The fourth functional block (804) may include a current steering block (700) that interconnects with the light switch (100). As discussed above with respect to FIG. 7A, the current steering block (700) may include n source nodes (710, FIG. 7A) that are connections with the screw terminals of the light switch and connect to the diode network (702, FIG. 7A). The diode network (702, FIG. 7A) steers the current from any source node to the first functional block (801) through the input node aa. The electrical current flows sequentially through the functional units to the output node bb, which is shown on the right side of the diagram. Current from the third or last functional block passes through the output node bb and is steered to a source node connected to a current sink. The output node bb is also shown below the current steering block (700) indicating that the output node on the right side of the diagram is connected to the output node bb below the current steering block. The current steering block (700) may include any number of additional elements, including fuses, surge resistors, or other elements.

As discussed above, the voltage isolator (810) may be configured such that the current controller (815) alters the external result (806) of the electrical load (805) independent of a voltage across the voltage isolator (810). FIG. 8B also shows isolator control feedback (807) that provides feedback to the voltage isolator (810) about the voltage across the current controller (815). In this example, the isolator control feedback (807) is connected on the opposite side of the current controller (815) near output node bb and feeds into the voltage isolator (810).

Figure 8C:
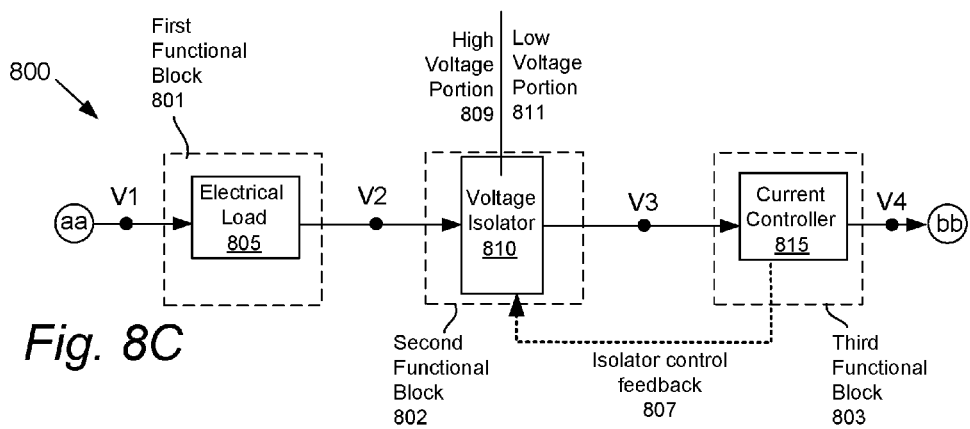

FIG. 8C shows one embodiment of an electrical circuit (800) where the current controller (815) directly controls the isolator control feedback (807). This is illustrated by the dashed line extending from the side of the current controller (815) to the voltage isolator (810). This allows for more dynamic control of the current flow through the circuit (800) and the voltage levels on the low voltage portion (811) of the circuit.

In some implementations, the first, second and third functional blocks (801, 802, 803) are configured so that voltage drops across the first, second and third functional blocks algebraically add to the total voltage applied across the input node aa and the output node bb. FIG. 8C shows a number of voltage nodes between the input node aa and the output node bb. V1 represents the voltage between the input node aa and the electrical load (805). V2 represents the voltage on the downstream side of the electrical load (805) and before the voltage isolator (810). V3 represents the voltage between the voltage isolator (810) and the current controller (815). The last voltage node, V4 represents the voltage on the far side of the current controller (815) at the output node bb.

An algebraic expression of the voltage drops through the circuit are as follows:
the voltage drop across the first functional block: V1–V2
the voltage drop across the second functional block: V2–V3
the voltage drop across the third functional block: V3–V4
the total voltage across the input node aa and the output node bb: V1–V4
For the implementation shown in FIG. 8C, it can be shown that the algebraic sum of the voltage drops across the functional blocks add to the total voltage across the input node aa and the output node bb. Specifically: (V1–V2)+(V2–V3)+(V3–V4)=(V1–V4).

Figure 9A:
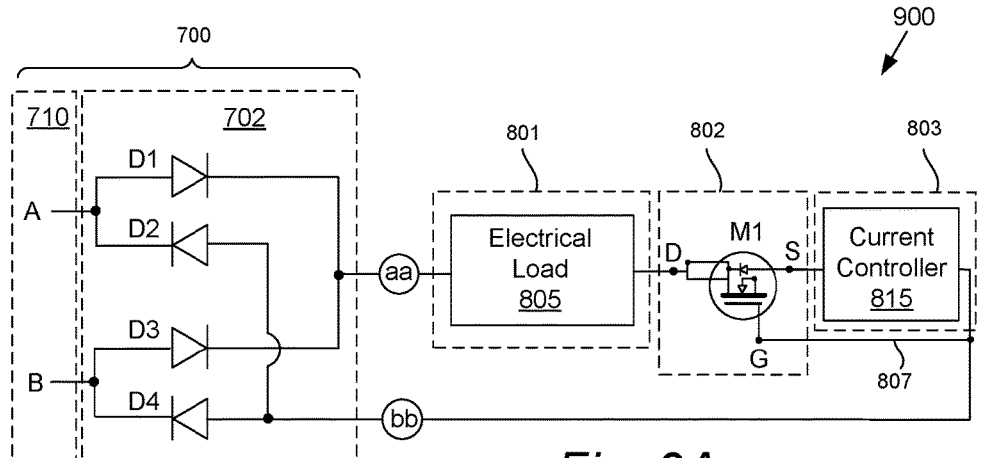
FIGS. 9A-9F are diagrams of illustrative limited current electrical circuits for functional wall plates, according to one example of principles described herein.
Figure 9B:
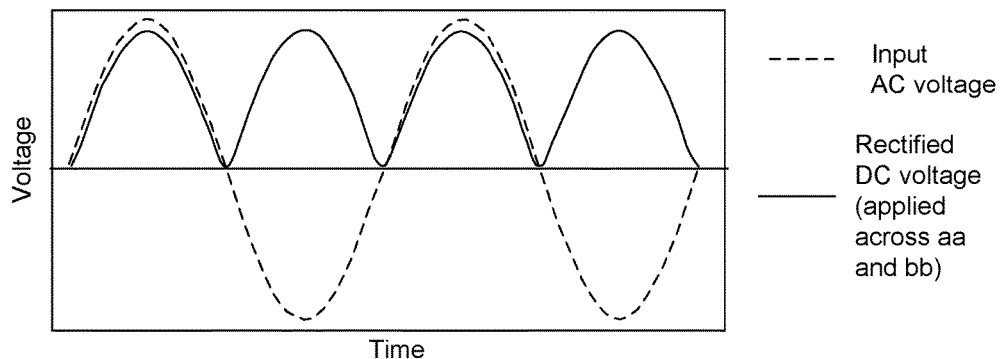
Figure 9C:
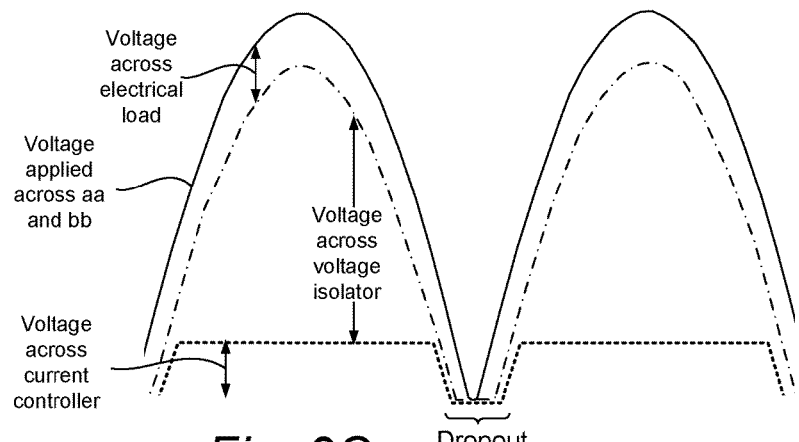

FIGS. 9A-9C describe examples of voltage limiting that can be provided by a voltage isolator M1. FIG. 9A shows an exemplary circuit (900) that includes a current steering block (700) with 2 source nodes (A and B) and diode network (702) that includes diodes (D1, D2, D3, and D4). The interface between the current steering block (700) and the other functional blocks (801, 802, 803) is the input node aa and the output node bb. The input node aa is connected to the first functional block (801) that includes an electrical load (805). The circuit also includes a second functional block (802) with a depletion mode field effect transistor M1 that acts as a voltage isolator. The depletion mode field effect transistor M1 may include a drain D connected to the electrical load (805), a source S connected to the current controller (815) and a gate G. The gate G and source S may be configured to receive isolator control feedback (807) from the current controller. In this example, the source S is at an input voltage to the current controller (815) and the gate G is at voltage on the opposite side of the current controller (815). Thus, the gate/source voltage of the depletion mode field effect transistor is the voltage across the current controller (815).

The graphs in FIGS. 9B and 9C show illustrative voltage waveforms across various locations in the circuit. The voltage waveforms are only used to illustrate various principles and are not to scale. The voltage waveforms are altered as the electrical current passes sequentially through the circuit (900). FIG. 9B compares the input AC voltage at the source nodes (710) with the rectified DC voltage applied across the input node aa and the output node bb. In the graph, the horizontal axis is time and the vertical axis is voltage. The input AC voltage is shown as a dashed sinusoidal waveform with both positive and negative portions. The steering and rectifying action of the diode network produces the fully rectified DC voltage across input node aa and output node bb. The rectified DC voltage is input to the electrical load (805) and passes into voltage isolator M1. A depletion mode field effect transistor (M1) limits the maximum voltage across the current controller (815).

FIG. 9C compares various voltages within the circuit. All the voltages referenced to output node bb. The rectified DC voltage applied across source nodes aa and bb is shown as a solid line and is the highest voltage. The voltage at a point between the electrical load (805) and the voltage isolator M1 is shown as a dashed-dot line. The voltage at a point between the voltage isolator M1 and a current controller (815) is shown as a dotted line.

With these voltage waveforms defined, the voltages across various circuit elements can be examined in the context of their operation. The voltage across the electrical load (805) reflects the energy consumption of the load. For example, if the voltage at the input node aa is 120 volts and the load includes 8 LEDs with a voltage drop across the LEDs of 24 volts, it would be expected that the voltage at the input to the voltage isolator would be approximately 100 volts. In this example, the majority of the voltage drop in the circuit occurs across the voltage isolator and is shown as the voltage difference between the dash-dot waveform and the dotted waveform. The voltage input into the voltage isolator (the dash-dot waveform) varies significantly over time, but the output of the voltage isolator is relatively constant as shown by the horizontal plateau in the dotted waveform. This represents the limited voltage output to the current controller. For example, if the current controller operates at 3 volts, the limited voltage represented by the horizontal plateau would be at 3 volts. Only when the dash-dot waveform (the input to the voltage isolator) drops closer to zero is any dropout in the limited voltage across the current controller. Thus, the voltages across the electrical load and voltage isolator varies considerably but the depletion mode field effect transistor M1 limits the voltage across the current controller, thereby isolating it from high voltage fluctuations while still allowing the controlling current flow to pass sequentially through the circuit.

Figure 9D:
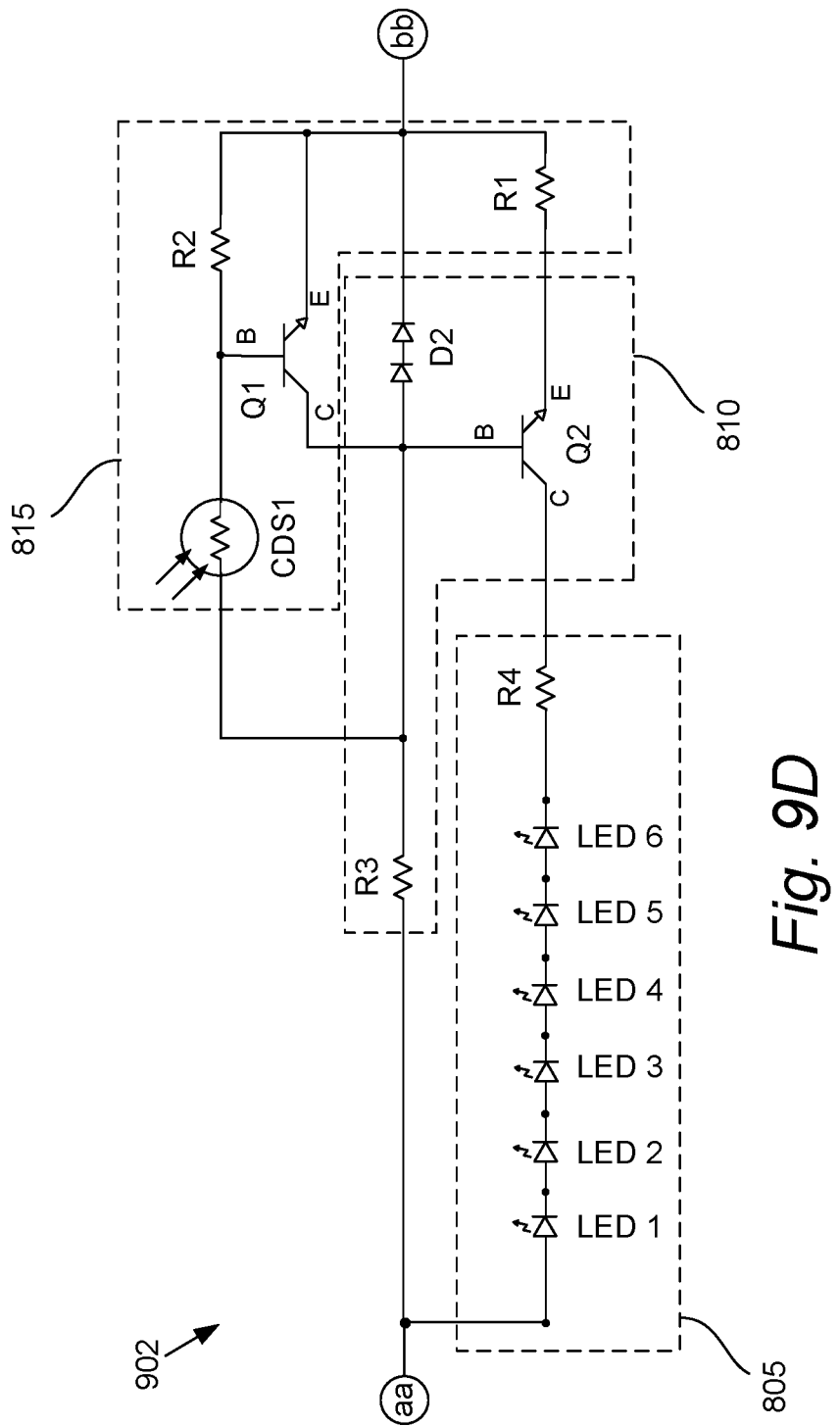

FIG. 9D shows one illustrative example of an electrical circuit (902) that includes an electrical load (805), a voltage isolator (810), and voltage controller (815). The electrical load (805) includes a series of 6 LEDs (LED 1, LED 2, . . . LED 6) and an optional series resistor R4. The LEDs are in series to further reduce the amount of required current by passing the same current through each LED. For example, individual LEDs may require a voltage difference between 2V-4V. Because the LEDs reside on the high voltage side of the circuit, there is ample voltage available. For example, if the AC input is 120 volts root mean square (RMS), then the peak of the rectified voltage will be approximately 170 volts. With 6 LEDs each requiring 3 volts, the total voltage across the LEDs would be approximately 18 volts. Thus, by placing the LEDs in series, the same current can pass through all the LEDs with a voltage drop of 3 volts across each LED. This minimizes the current required to produce the desired amount of illumination. The LEDs begin to illuminate at very low currents that are significantly below the rated operating current. For example, an LED may be rated for use at 20 milliamps but may produce low levels of illumination at 0.25 milliamps. Consequently by using multiple LEDs, the low illumination at low currents from each LED can be added together to achieve the desired illumination level. Resistor R4 is in series with the LEDs and can be used to adjust the brightness of the LEDs.

The voltage isolator (810) includes resistor R3, transistor Q2, and diode D2. Resistor R3 maintains a specified voltage difference between node aa and node B of Q2. It also permits a small amount of current to pass into the base of Q2. The resistor R3 has a relatively high resistance such that only a minority of current passes through it while the majority of the current passes through the LEDs. In some situations, multiple series resistors may replace R3. For example, multiple small package sized resistors could be used in series instead of a single larger resistor.

In this embodiment, the voltage isolator comprises a bipolar junction transistor Q2 and its supporting circuitry. In this case the load is connected to the collector side C of the transistor Q2. The voltage at base B of Q2 is established by two diodes D2. The diodes are particularly valuable in establishing the voltage because the voltage drop across the diodes is relatively independent of the current that passes through the diodes. For example, with silicon diodes, the voltage drop across a single diode is about 0.6 volts. Consequently, the voltage drop across two diodes is approximately 1.2 volts greater than the output voltage level at output node bb. This forces the base B of Q2 to be 1.2 volts higher than the voltage at the output node bb. This becomes the reference voltage in the voltage isolator (810). The bipolar junction transistor Q2 operates based on the base emitter current flow and provides a controlled voltage to the control resistor R1.

Current flow passing through the voltage isolator (810) is accepted by the current controller (815). The current controller (815) limits the amount of current passing through the circuit (902) and thus influences the operation of all of the other circuit blocks, including the voltage isolator (810) and the electrical load (805).

In this example, the current controller (815) includes a photoresistor (CDS1), a transistor Q1, and resistors R2 and RE The photoresistor (CDS1) and R2 create a voltage divider with voltage at the base node of Q1. The voltage at the base node Q1 is dependent on the amount of ambient light incident on the photoresistor. Resistor R2 provides sensitivity adjustment for the ambient light switching. The transistor Q1 responds to the base B and emitter E current, which is proportional to the amount of ambient light. When the ambient lighting is low, the photo-resistor has a high resistance and the voltage at the base B of Q1 is also low because there is a large voltage drop across the photoresistor. Consequently, when the ambient light is low, the base B has a low voltage and the base/emitter current does not trigger Q1 to electrically connect the collector (C) to the emitter (E). This maintains the voltage at the base B of Q2 high enough for Q2 to remain ON and connect collector (C) and emitter (E). This allows current to pass through the LEDs and provide illumination while the ambient light is at low levels (i.e. the room is dark).

Resistor R1 controls the current flow and brightness when the LEDs are on. Because there is only 1.2 volts and the there is approximately a 0.2 volt drop across the transistor Q2 when it connects the collector and emitter, there is only 1.0 volts across RE The energy dissipation of a resistor is proportional to the product of the voltage across the resistor and the current flowing through the resistor. Consequently, the power dissipation of resistor R1 is minimal because of the low amount of voltage across it and the low amount of current that flows through the series LEDs. Thus in this example, the current control block (815) includes a light sensor (CDS1) and its supporting circuitry and a current limiting resistor R1.

Figure 9E:
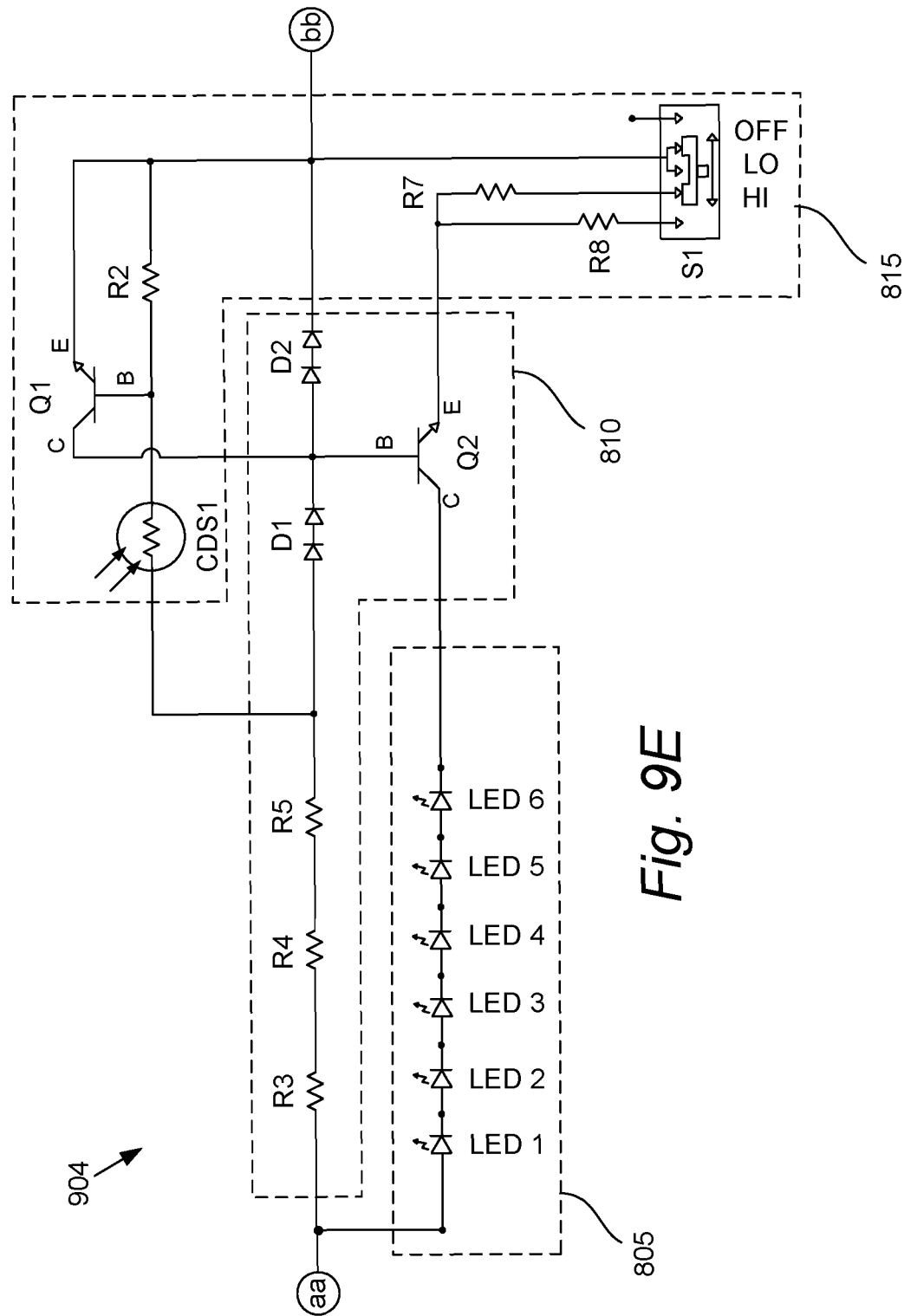

FIG. 9E is an alternative embodiment of the circuit of FIG. 9D, where the current limiting resistor R1 is replaced by a three position slide switch S1 and selectable resistors R7 and R8. This allows for manual selection by the user of the brightness of the LEDs. The user may use the switch S1 to select OFF, LO and HI settings. If the user moves the slide to the far right, the functional wall plate will not illuminate even if the room is dark because there is no current path through the switch S1 to the output node bb. Additionally, R7 may have a comparatively higher resistance than R8. Consequently, when resistor R7 is selected by switch S1, the current flow through R7 will be lower than R8 and the light output of the LEDs will be low. When resistor R8 is selected, the light output of the LEDs will be higher.

Thus, the current controller (815) includes a switch S1 and a first current controlling element (e.g. R7) and a second current controlling element (e.g. R8), where the switch S1 is configured to select the first controlling element or the second controlling element. As discussed above, the switch S1 may be a small low voltage switch that relies on the voltage isolator to limit the voltage across the current controller to a voltage rating of the switch. This is particularly important when the current through the switch is zero. For example, the current through the switch S1 may be zero when the switch is open (in the OFF position). In this configuration, the entire voltage in the current controller (from the emitter E of Q2 to the output node bb) is across the switch S1 when the switch S1 is in the OFF position.

Figure 9F:
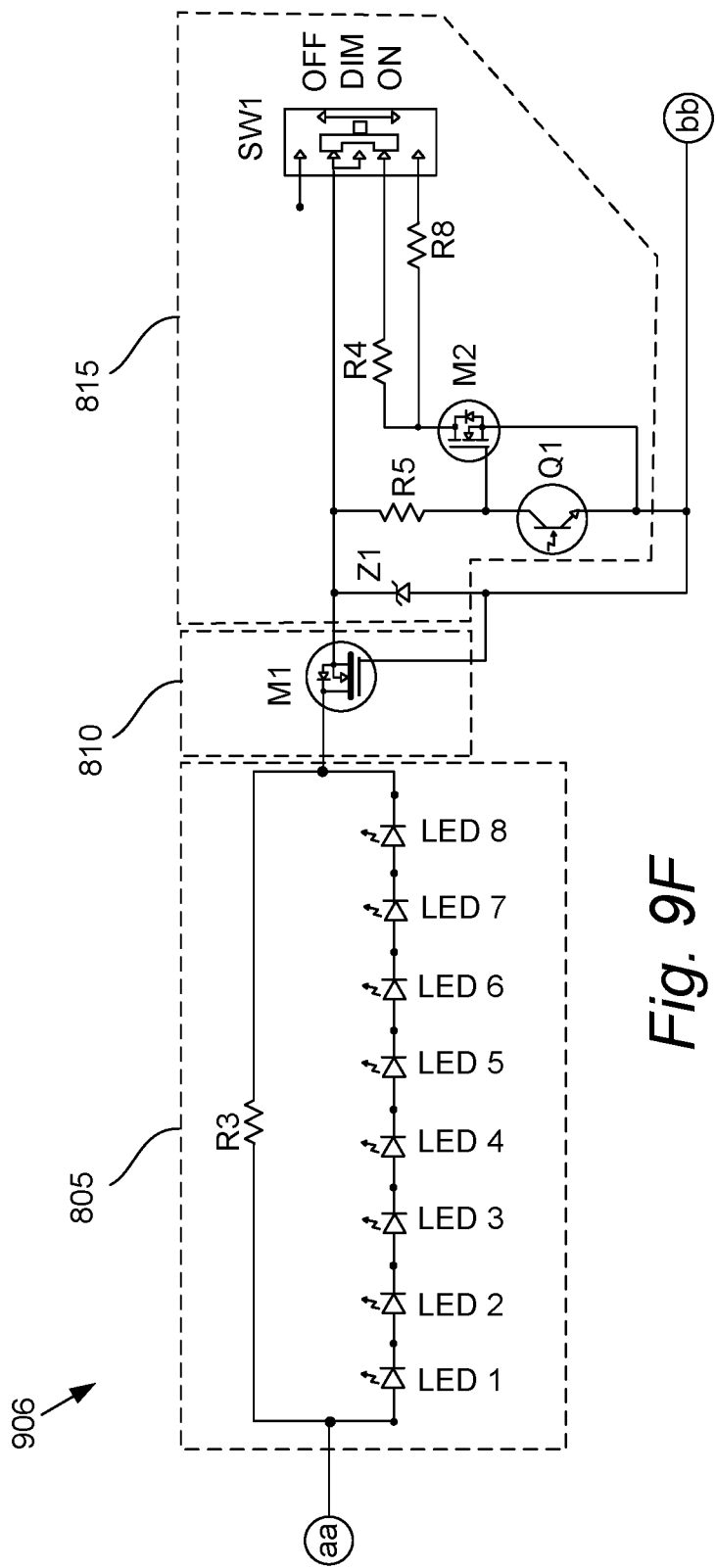

FIG. 9F shows an alternative embodiment of a circuit (906) that includes an input node aa, an electrical load (805) with 8 series LEDs (LED 1, LED 2, LED 3 . . . LED 8), a voltage isolator (810) that includes a depletion mode field effect transistor M1, a current controller (815) and an output node bb. The electrical load (805) includes 8 LEDs in series and a resistor R3. Due to the unique design of the circuit, any number of LEDs can be used in the circuit without any modification to the power supply or control portions of the circuit. For example, the circuit could support one LED, two LEDs, 4 LEDs, 8 LEDs, 16 LEDs or any number in-between. The only limit on the number of LEDs that could be used is the amount of voltage required by the LEDs to illuminate. For example, if the LEDs illuminate when a voltage of 3V is placed across them, then 30 LEDs would need a total voltage difference of 90 V. In the example shown in FIG. 9F, there are 8 LEDs in series (LED1, LED2 . . . LED8). If it is decided that fewer LEDs should be used in a particular design, the LED position in the circuit can be omitted or replaced with a 0 ohm resistor. There is no other required change to the circuitry. This is because the depletion mode FET controls the amount of current flowing through the LEDs. Because the LEDs are in series, the same current flows through each LED. For brighter illumination, more current is passed through the LEDs. This can result in a higher voltage across each LED and causes each LED to increase its light output.

Resistor R3 has a relatively high resistance and is in parallel with the series LEDs. The purpose of R3 is to prevent undesired illumination or glowing of the LEDs due to stray voltage or leakage currents and to allow some portion of the controlled current to not affect the external result. In one embodiment, R3 may have a resistance of about 1 MOhm and only allows a minimal amount of current to pass through it. If the 8 LEDs are assumed to each have a voltage drop of 3 volts, then the voltage across the load is approximately 24 Volts. Thus, 24 volts is also applied across R3. The current passing through R3 can then be calculated by dividing the voltage by the resistance: 24 Volts/1,000,000 Ohms=0.000024 amps or 24 microamps. The power, in watts, that is dissipated by R3 can be found by multiplying the resistance and the square of the current: 1,000,000* (0.000024)^2=0.58 milliwatts. Because the current passing through R3 is very small, this alternative current path does not have a substantial impact on the overall efficiency of the circuit.

In the example shown in FIG. 9F, the depletion mode FET M1 is an N-type device, with the drain connected to the load side of the circuit, the gate connected to ground and the source connected to the current controller (815) and switch SW1. The depletion mode FET divides the circuit into two sections: a high voltage side that contains the series LEDs and a low voltage side that contains the current controller (815) with the low voltage switch SW1 and other control circuitry. The depletion mode FET controls the current which flows from the high voltage side connected to the drain to the low voltage side.

FIG. 9F also shows a Zener diode Z1 in the control circuitry. The Zener diode is for surge suppression for rare cases when the drain-to-source voltage is exceeded on M1. A phototransistor Q1 acts in conjunction with a transistor M2 to prevent current from flowing through the circuit when the phototransistor detects ambient light above a light threshold. Resistor R5 is one mechanism for setting the light threshold.

Figure 10A:
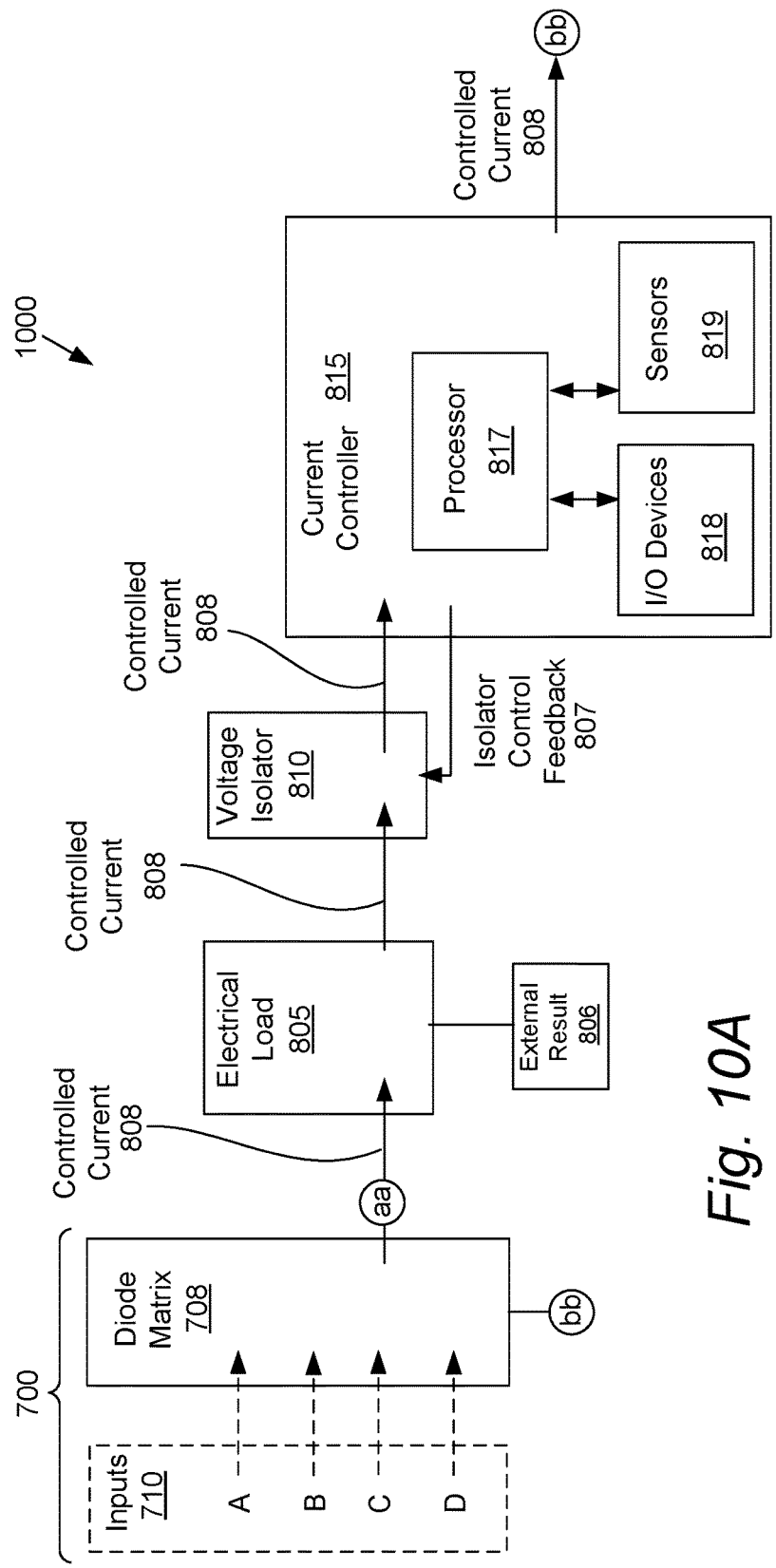
FIGS. 10A and 10B are diagrams of illustrative circuits that include a low voltage processor as part of a current controller, according to one example of principles described herein.

FIG. 10A is a diagram of a circuit (1000) that shows the current steering block (700) that includes a number of inputs (710) that are connected to a diode matrix (708). As discussed above, the current steering block (700) steers a controlled current (808) to input node aa. The current steering block (700) may have any number of configurations, including those shown in FIGS. 7A, 7B, 7C and 7D. There may be any number of inputs (710). For example there may be 2, 3, 4, or 5 inputs into the diode matrix (708).

The controlled current (808) passes through the electrical load (805) to power the electrical load and produce the external result (806). The controlled current (808) then passes into the voltage isolator (810). The voltage isolator (810) passes the controlled current (808) to the current controller (815) while stabilizing a voltage associated with the controlled current. This voltage is across the current controller (815) and any additional functional blocks or elements that may be present downstream from the voltage isolator. The voltage isolator (810) may use any of a variety components and configurations to stabilize a voltage across the current controller while allowing the controlled current (808) to pass to the current controller. For example the voltage isolator (810) may include one or more transistors, such as bipolar junction transistors (see e.g. FIGS. 9D, 9E) or field effect transistors (see e.g. FIGS. 9A, 9F). In this example, the voltage isolator (810) accepts isolator control feedback (807) from the current controller.

The current controller (815) in this example includes a processor (817) and may include various other elements such as input/output devices (818) and sensors (819). For example, the input/output devices may include wireless communication modules, buttons, capacitive touch pads, or other devices. The sensors (819) may include a wide range of elements including temperature, humidity, light, motion, gas, and other sensors.

The processor may perform any number of functions, including activating various elements, reading and processing data from elements, and taking other actions. The processor (817) may also influence the isolator control feedback (807). The isolator control feedback (807) may be fundamentally tied to a voltage across the current controller, but the processor may alter the voltage to produce desired results. For example, a particular element in the current controller (815) may require additional voltage during startup. To assist that element in starting up, the processor (817) may influence the isolator control feedback (807) so that the voltage isolator (810) increases the voltage and/or current available to the current controller (815). The voltage control feedback (807) may take any of a number of forms, including voltage levels, current levels, various electrical waveforms, or data transfer.

The current controller (815) accepts the controlled current (808) and uses the controlled current to power its operations. In some situations, the amount of current consumed by the current controller (815) may significantly influence the magnitude of the controlled current (808) that passes through the system. For example, if the processor (817) consumes more current, the controlled current (808) may increase and this may influence the external result (806) produced by the electrical load. Thus, by modulating the current consumed by the processor (817) and other elements in the current controller (815), the controlled current (808) changes and may change the external behavior (e.g. external result 806) of the system.

Figure 10B:
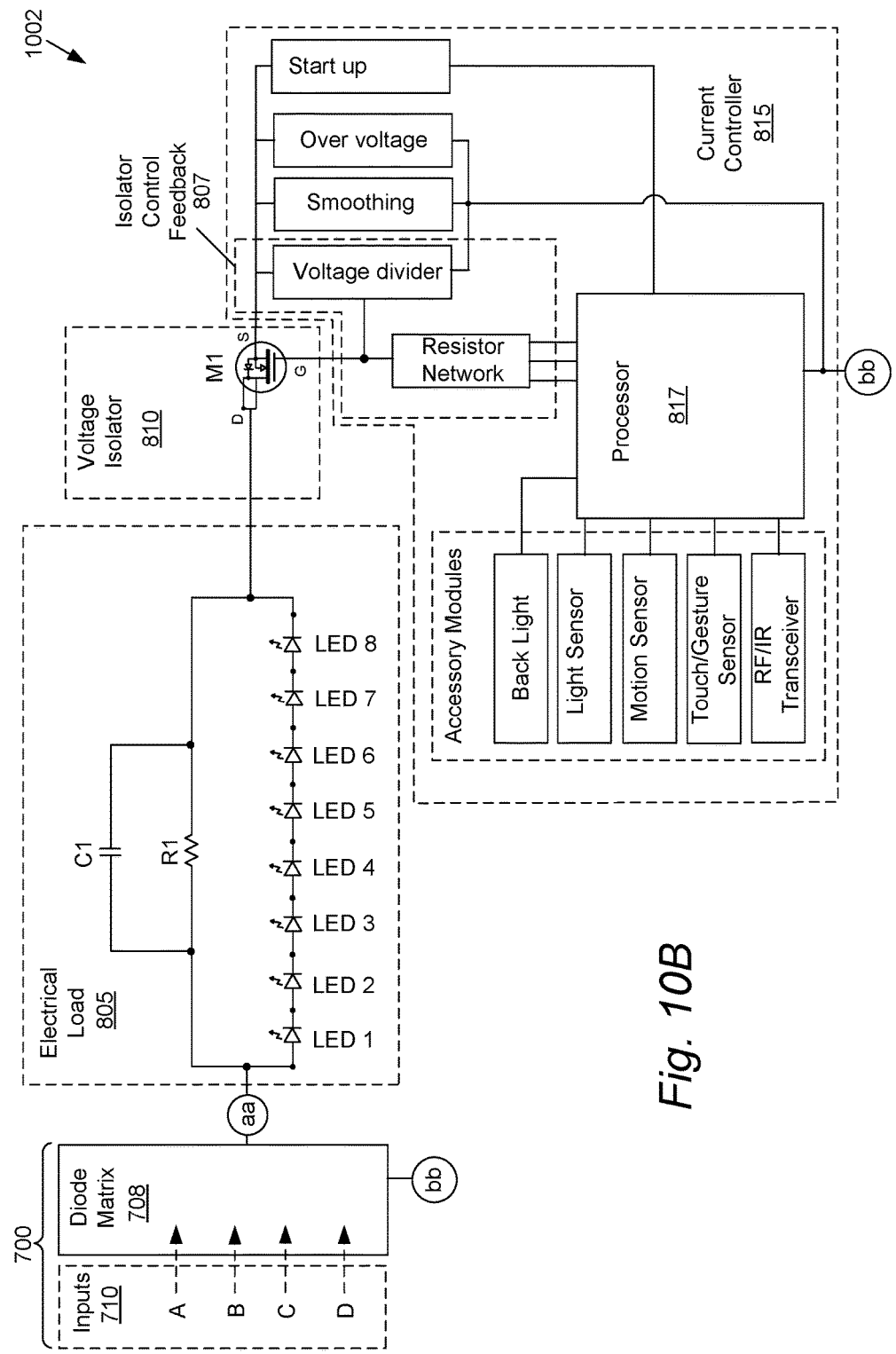

FIG. 10B shows an illustrative circuit (1002) with additional detail. The circuit includes a current steering block (700) that includes electrical inputs (710) and a diode matrix (708); an electrical load (805); a voltage isolator (810); and a current controller (815). As discussed above, the current steering block (700) accepts power from an external source such as light switch terminals and steers the current to an input node aa and accepts current through an output node bb.

In this example, the electrical load (805) includes eight LEDs (LED1, LED2 . . . LED8). As discussed above, there may be any number LEDs with the upper limit on the number of LEDs dictated by the available voltage between node aa and bb. The resistor R1 is in parallel with the series LEDs. Resistor R1 provides an alternative current path in parallel with the series LEDs and allows some portion of the controlled current to not affect the external result (806). Resistor R1 may be sized to allow the processor (817) to function in a low current baseline configuration, but the LEDs will not illuminate until the processor increases its current consumption over the base line. Thus, a resistance may be placed in parallel with the light emitting diodes to prevent controlled current below a predetermined threshold from impacting the external result. In this case the external result includes the light produced by the LEDs, but the external result may be any desired result supplied to the user by the electrical load.

A capacitor C1 is also parallel with the series LEDs. This capacitor may function to prevent flickering of the LEDs during transient events and to store and supply a charge for transient processes that require slightly more current. For example, the processor (817) may demand an additional burst of current for a short period of time—or in other words, a burst of electrical "charge". Since the voltage across R1 is a strict relationship of current (charge per unit time), even a short burst of current by the processor (817) may exceed the predetermined threshold and adversely impact the external result. Capacitor C1 by definition can only change voltage across itself by integrating the amount of charge placed on its plates in time. The size of C1 effects the relationship between charge on the plates and voltage drop across the capacitor. By placing C1 in parallel with R1, the overall voltage drop cannot increase without first placing a charge on C1. Thus, a capacitance (e.g. C1) may be placed in parallel with light emitting diodes (e.g. LED 1 . . . LED8) to prevent charge below a predetermined threshold from impacting the external result.

The voltage isolator (810) in this example is a depletion mode FET (M1), with the drain D connected to the electrical load (805) and the source S connected to the current controller (815). In this case the current controller (815) contains a number of additional modules, including isolator control feedback (807), smoothing, over voltage, and startup modules. The smoothing module may contain capacitors to maintain the low voltage waveform through drop-out conditions as indicated in FIG. 9C. The over voltage module may provide additional or redundant protection against transient applied voltage surges that exceed the breakdown of the depletion mode FET (M1) that could damage sensitive components on the low voltage side of the voltage isolator (810). For example, the over voltage module may contain Zener diodes, transistors, etc. that will shunt current to the output node bb to prevent over voltage events. The startup module could be used to modify the startup voltage ramp when power is initially applied to the circuit to be compatible with the voltage ramp required by the processor (817). For example, the smoothing module may absorb a significant amount of current during startup and slow the voltage rise in the current controller (815). If the processor (817) needs a rapid voltage rise to boot up, it may lock up or malfunction if the voltage rise is too slow. The startup module may delay passing current/voltage to the processor (817) until the capacitors in the smoothing circuit have a significant charge.

The isolator control feedback (807) in this example includes a voltage divider and a resistor network that is connected to the voltage isolator (810). The voltage divider may be used to raise the gate reference voltage above voltage at the output node bb. For example, if the depletion mode FET M1 controls current flow so that there is a 1.4 volt difference between the gate and source nodes, but the processor operates at voltages around 3.0 volts, it will be desirable to raise the reference voltage. The voltage divider may include resistors, capacitors, transistors and other components that provide the desired response and voltage to the gate of the depletion mode FET M1.

In some implementations, it may be desirable for the processor (817) to have additional control of the voltage output by the voltage isolator (810). A resistor network can be connected to the gate node and controlled by the processor (817). For example, the resistor network may include resistors of different values that are connected on one side to the processor and on the other side to the gate node. The processor may actively control the voltage on its side of the resistors. For example, the processor may connect the resistors to ground, disconnect the resistors so that the resistors potentials float, or connect to the resistors a specific voltage reference. This may be done for any or all of the resistors. By selecting which of the resistors the processor connects various voltages to, eight or more levels of output voltage from the voltage isolator can be selected. In other cases, one or more of the connections to the resistor network may be an analog output from the processor (817) with tens or hundreds of different voltage output levels. This may provide tighter control of the voltage output by the voltage isolator (810).

There may be a variety of other modules included in the circuit that add functionality. For example, there may be a number of accessory modules, such as a controlled backlight for a button or image, a light sensor for detecting ambient light, a motion sensor to detect when people are present near the functional wall plate, a touch/gesture sensor to accept user input to control functions within the functional wall plate or other devices, and a transceiver to receive and transmit signals to other devices. There are a variety of other accessory modules that could be used, including sensors that detect additional environmental conditions, input/output functionality, cameras, speakers, or other functions.

The examples given above are only illustrative. There are a number of other configurations and circuit designs that could be used in accordance with the principles described. For example, there may be an additional technique that provides larger amounts of power from a switch without causing undesirable behavior by the load controlled by the switch. Specifically, users who turn on a light switch typically want the area to be illuminated immediately. This is because the user is typically stepping into a room and needs the illumination to help them navigate and/or see the contents of the area. However, users do not particularly care that lights immediately turn off when a switch is turned off. For example, upon going to bed, a user may appreciate that the lights don't immediately turn off, because the gradual dimming of the lights provides their eyes time to adjust to the darkness and gives them time to get to the bed before the light is entirely gone.

This desirable "dimming" effect can be utilized to extract energy from the light switch circuit and store it in a functional wall plate or other device. According to one embodiment, after the light switch is turned off, the circuit in the functional wall plate allows relatively large amounts of current to flow through the circuit so that the light gradually dims. A capacitor, battery, or other storage device can tap into the current that is still flowing through the circuit and light as it dims. In one example, the mechanical switch itself is disconnected, but a significant amount of current passes through the parallel circuit in the functional wall plate, charging the capacitor or other storage device. As the device charges, this current flow decreases and the lights gradually dim. In one embodiment, an ultra-capacitor is charged over the course of several seconds while the lights dim. The ultra-capacitor is then discharged to charge a lithium ion battery. However, this is only one embodiment. A variety of other embodiments could be used. For example, a fast charging battery could be charged during the dimming of the light and be used as a battery source to supply energy to the circuit at a later point or when the lights are on.

Other implementations for extracting power from light switch circuits includes never turning the light on and simply allowing the parallel circuit in the functional wall plate to conduct all the power required by the load connected to the switch. Thus, when the light is on, the circuit could extract a significant amount of power from the current flow without disrupting the lighting. This creates the significant challenge of handling up to the maximum rated circuit capacity through the prongs or other contacts. Several approaches could be used individually or in combination. For example, one approach would be to monitor current flow through the prongs and wall plate circuitry and throttle the flow if it became excessive or exceeded the current draw the prongs or circuitry were rated for. A similar approach would be to monitor the temperatures of the prongs and/or circuitry. If the temperatures were high, the circuit could shut down or reduce the amount of current. Other approaches may include circuitry that detects arcing or excessive contact resistance at the prongs. If arcing or an increase in contact resistance was detected, the circuitry could shut down or throttle the current flow.

The preceding description has been presented only to illustrate and describe examples of the principles described. This description is not intended to be exhaustive or to limit these principles to any precise form disclosed. Many modifications and variations are possible in light of the above teaching.

What is claimed is:

1. An electrical circuit comprising:
    a first functional block comprising an electrical load to produce an external result;
    a second functional block comprising a voltage isolator; and
    a third functional block comprising a current controller;
    wherein the first, second, and third functional blocks are connected such that the external result of the electrical load is configured to be determined by the current controller acting through the voltage isolator;
    wherein the voltage isolator is configured to limit a maximum voltage across the current controller;
    wherein a controlling current flow through the current controller controls the external result of the electrical load; and
    wherein the controlling current flow passes sequentially through the electrical load, the voltage isolator, and the current controller to a current sink.

2. The circuit of claim 1, further comprising:
    an input node connected to the first functional block;
    an output node connected to the third functional block;
    wherein the first, second, and third functional blocks are configured such that voltage drops across the first, second and third functional blocks algebraically add to a total voltage applied across the input node and the output node.

3. The circuit of claim 1, further comprising a fourth functional block comprising a current steering block.

4. The circuit of claim 3, wherein the current steering block comprises:
    a diode network;
    at least n source nodes connected to the diode network, wherein n is three or greater;
    an input node, wherein current sourced from any source node is steered to the first functional block through the input node; and
    an output node, wherein current from the third functional block is sinked into the output node and is steered to a source node connected to a current sink.

5. The circuit of claim 1, wherein the voltage isolator is configured such that the current controller alters the external result of the electrical load independent of a voltage across the voltage isolator.

6. The circuit of claim 5, wherein the current controller comprises a light sensor to control the controlling current flow through the electrical load in response to an ambient light level.

7. The circuit of claim 1, wherein the voltage isolator comprises a depletion mode field effect transistor.

8. The circuit of claim 7, wherein the depletion mode field effect transistor comprises:
a drain connected to the electrical load;
a source connected to the current controller; and
a gate; wherein the gate and the source are configured to receive an isolator voltage feedback.

9. The circuit of claim 8, wherein the isolator voltage feedback comprises a voltage across the current controller.

10. The circuit of claim 8, wherein the current controller controls the isolator voltage feedback.

11. The circuit of claim 1, wherein the current controller comprises a switch, a first current controlling element and a second current controlling element, wherein the switch is configured to select the first controlling element or the second controlling element.

12. The circuit of claim 11, wherein the voltage isolator limits a voltage across the current controller to a voltage rating of the switch when a current through the switch is zero.

13. The circuit of claim 1, wherein the voltage isolator limits a voltage across the current controller to a voltage rating of a mechanical switch in the current controller when a current through the voltage isolator is zero.

14. The circuit of claim 1, wherein the current controller comprises a microprocessor, wherein an output of the microprocessor is configured to actively control an isolator voltage feedback and to actively control current flowing through the voltage isolator.

15. The circuit of claim 1, wherein the electrical load comprises a plurality of light emitting diodes in series and wherein the external result comprises light configured to be emitted by the light emitting diodes.

16. The circuit of claim 15, wherein a resistance is placed in parallel with the plurality of light emitting diodes to prevent current below a predetermined threshold from impacting the external result.

17. The circuit of claim 15, wherein a capacitance is placed in parallel with the plurality of light emitting diodes to prevent a charge below a predetermined threshold from impacting the external result.

18. A functional wall plate comprising:
a face plate;
at least three prongs extending rearward from the faceplate configured to electrically contact terminals of a multi-pole switch; and
a circuit electrically connected to the at least three prongs, wherein the circuit comprises:
a current steering block electrically connected to the at least three prongs and to receive current from the prongs;
an electrical load to receive the current from the current steering block and produce an external result;
a voltage isolator connected in electrical series with the electrical load and to receive the current after the electrical current passes through the electrical load; and
a current controller connected in electrical series with the voltage isolator, wherein the current controller is configured to receive the current from the voltage isolator, wherein the current controller is configured to limit the current such that the current controller controls the external result of the electrical load.

19. An electrical circuit comprising:
an electrical load comprising a plurality of light emitting diodes in series configured to emit light;
a current controller;
a voltage isolator interposed between the electrical load and the current controller, the voltage isolator comprising a depletion mode field effect transistor comprising:
a drain connected to the electrical load;
a source connected to the current controller; and
a gate;
wherein the gate and the source are configured to receive an isolator voltage feedback from the current controller to limit a maximum voltage across the current controller.

20. The circuit of claim 19, wherein the current controller comprises a switch, a first current controlling element, and a second current controlling element, wherein the switch is configured to select the first controlling element or the second controlling element; and wherein the voltage isolator is configured to limit a voltage across the current controller to a voltage rating of the switch when the switch is open and breaks continuity in the circuit.

* * * * *